United States Patent
Ogawa

(10) Patent No.: US 7,242,547 B2
(45) Date of Patent: Jul. 10, 2007

(54) MAGNETIC HEAD DEVICE, ROTARY HEAD DEVICE, MAGNETIC TAPE DEVICE, MAGNETIC DISC DEVICE, AND MAGNETIC RECORDING METHOD

(75) Inventor: Kazushi Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 234 days.

(21) Appl. No.: 11/065,916

(22) Filed: Feb. 25, 2005

(65) Prior Publication Data

US 2005/0213240 A1    Sep. 29, 2005

(30) Foreign Application Priority Data

Mar. 25, 2004    (JP) .......................... P2004-090322

(51) Int. Cl.
*G11B 15/14* (2006.01)

(52) U.S. Cl. .................................................. 360/64

(58) Field of Classification Search ................. 360/64, 360/75, 77.12, 115, 125, 58, 63, 77.13
See application file for complete search history.

(56) References Cited

U.S. PATENT DOCUMENTS

| | | | | | |
|---|---|---|---|---|---|
| 4,899,241 | A | * | 2/1990 | Miyakawa et al. | ......... 360/125 |
| 5,056,353 | A | * | 10/1991 | Matono | ........................... 73/7 |
| 5,119,255 | A | * | 6/1992 | Gooch | ........................ 360/115 |
| 5,189,572 | A | * | 2/1993 | Gooch | ..................... 360/77.12 |
| 6,542,322 | B2 | * | 4/2003 | Maemine | ..................... 360/64 |
| 6,549,356 | B1 | * | 4/2003 | Ozue et al. | .................... 360/64 |
| 6,813,109 | B2 | * | 11/2004 | Ozue et al. | ................... 360/64 |
| 6,922,298 | B2 | * | 7/2005 | Ozue | ......................... 360/64 |
| 7,009,794 | B2 | * | 3/2006 | Kano | ......................... 360/64 |
| 7,023,635 | B2 | * | 4/2006 | Yamazaki et al. | ............ 360/46 |
| 2004/0196583 | A1 | * | 10/2004 | Suzuki et al. | ................. 360/64 |

\* cited by examiner

*Primary Examiner*—Fred F. Tzeng
(74) *Attorney, Agent, or Firm*—Sonnenschein Nath & Rosenthal LLP

(57) ABSTRACT

A magnetic head device scanned to a magnetic recoding medium has a plurality of recording head elements laminated on a base via insulating layers, the plurality of recording head elements are formed such that the size in a track width direction of a first magnetic core layer, of a pair of magnetic core layers opposed via a magnetic gap, positioned at a preceding side in a scanning direction of the head becomes smaller than the size in a track width direction of a second magnetic core layer positioned at its opposite side, and the ends of the adjacent first magnetic core layers are disposed to be deviated in a direction perpendicular to the laminating direction to be superposed in a predetermined width as seen from a laminating direction.

18 Claims, 17 Drawing Sheets

SECTIONAL VIEW ALONG X-X'

MAGNETIC HEAD DEVICE, ROTARY HEAD DEVICE, MAGNETIC TAPE DEVICE, MAGNETIC DISC DEVICE, AND MAGNETIC RECORDING METHOD

BACKGROUND OF THE INVENTION

1. Field of the Invention

The present invention relates to a magnetic head device having a plurality of recording head elements, and a rotary head device using the same, a magnetic tape device, a magnetic disc device and a magnetic recording method.

This application claims priority of Japanese Patent Application No. 2004-090322, filed on Mar. 25, 2004, the entirety of which is incorporated by reference herein.

2. Description of Related Art

Generally, a magnetic head supplies a current corresponding to a recording signal to a coil. A magnetic flux flows to a pair of magnetic cores by a magnetic field generated from this coil, and a recording magnetic field is generated in a magnetic gap between the magnetic cores. The magnetic head records the signal by applying the recording magnetic field to a magnetic recording medium. Heretofore, as such a magnetic head, so-called a bulk type magnetic head, in which a pair of magnetic cores made of a magnetic material are opposed to form a magnetic path, a magnetic gap of an minute space is formed on the opposed surfaces of the pair of the magnetic cores, and a coil for generating the magnetic field is wound around the magnetic cores, is used. Further, so-called a metal in gap (MIG) type magnetic head, in which in association with recently a high recording density, metal magnetic thin films having a high saturation magnetic flux density are formed on the opposed surfaces of a pair of magnetic cores made of a ferrite, etc. and these metal magnetic thin films are opposed via a non-magnetic film or a magnetic gap, has been in practical use.

However, in such a magnetic head, to respond to a request for raising a recording density, a track width is narrowed, and the improvement in the dimensional accuracy in the track width direction becomes important more and more. However, there is a limit to manufacture the magnetic head by finely processing it, and it becomes very difficult to narrow the track width in response to the high recording density.

Therefore, as the magnetic head corresponding to the high recording density, so-called a thin film magnetic head, in which respective constituting elements are laminated on a substrate by a thin film forming technique, is proposed. Since the constituting elements of the magnetic core, coil, etc. in this thin film magnetic head are formed by a thin film forming technique such as a plating method, a sputtering method, an ion milling method, etc., a dimensional miniaturization, such as track narrowing, gap narrowing is facilitated, a size is reduced, and a recording density on a magnetic recording medium can be raised.

For example, in a thin film magnetic head 400 shown in FIG. 1, FIG. 2 and FIG. 3, a lower magnetic core layer 402 and an upper magnetic core layer 403 for forming a magnetic path are laminated on a substrate 401. The lower magnetic core layer 402 and the upper magnetic core layer 403 respectively have protruding parts 402a and 403a protruding from the ends of the opposed surface 400a side, opposed to the magnetic recording medium by predetermined track width sizes $w_2'$, $w_1'$. These protruding parts 402a and 403a are opposed to each other via a non-magnetic layer 404 to form a magnetic gap G'. The lower magnetic core layer 402 and the upper magnetic core layer 403 are connected at the other end separated in a depth direction from the opposed surface 400a to form a back gap. A thin film coil 405 wound spirally at this back gap as a center is provided to be embedded in the non-magnetic layer 404. The ends of an inner peripheral side and an outer peripheral side of the thin film coil 405 are extended toward the opposite side to the opposed surface 400a. Here, external connection terminals 405a, 405b connected to an external circuit are provided. A protective layer 406 covering the entire surface except the parts that the external connection terminals 405a, 405b of the thin film coil 405 face outside is provided on the uppermost layer of this substrate 401.

In the thin film magnetic head 400 as described above, respective constituting components are formed on the substrate 401 by the thin film forming technique, and hence the track can be narrowed, and the request for further raising the recording density of the magnetic recording medium can be responded. It is proposed that the thin film magnetic head 400 manufactured by such a thin film manufacturing process is utilized for a magnetic disc device, such as a hard disc drive (HDD), etc. at an the beginning, and is utilized recently for a magnetic tape device, such as a video tape recorder (VTR), a tape streamer, etc.

Incidentally, in the above-mentioned thin film magnetic head 400, it is general that the track width size $w_2'$ of the lower magnetic core layer 402 formed on the substrate 401 is larger than the track width size $w_1'$ of the upper magnetic core layer 403 formed thereon.

More particularly, in the above-mentioned thin film manufacturing process, as shown, for example, in FIG. 4, it is easy to form a layer 501 having a wide width on a substrate 500 and to form a layer 502 having a narrow width thereon. On the other hand, as shown in FIG. 5, if the layer 501 having a wide width is formed on the layer 502 having a narrow width, since both the ends of the layer 501 having a wide width in the width direction cover both the ends of the layer 502 having a narrow width, the layer 501 having a wide width becomes a round shape. In this case, it is difficult to form the layer 501 having a wide width in a desired shape, such as, for example, linearly long in a width direction.

Therefore, in order to solve such a problem, as shown in FIG. 6, it is necessary to adopt special steps of forming layers 503 having the same thickness at both sides of the layer 502 having a narrow width and forming the layer 501 having a wide width thereon.

However, even if such steps are adopted, it is not easy to form the layers 503 having the same thickness at both sides of the layer 502 having a narrow width. For example, as shown in FIG. 7, if the layers 503 being thinner than the layer 502 are formed at both sides of the layer 502 having a narrow width, the layer 501 having a wide width and formed thereon becomes the shape in which both the ends of its width direction are bent downward. On the contrary, if the layers 503 being thicker than the layer 502 are formed, the layer 501 having a wide width and formed thereon becomes the shape in which both the ends of its width direction are bent upward. Further, as shown in FIG. 8, a gap 504 might be formed between the layer 502 having a narrow width and the layers 503 formed at both the ends of its width direction. Even in this case, it is difficult to form the layer 501 having a wide width in a desired shape.

Therefore, even in the above-mentioned thin film magnetic head 400, the track width size $w_2'$ of the lower magnetic core layer 402 formed on the substrate 401 becomes larger than the track width size $w_1'$ of the upper magnetic core layer 403.

Here, in the thin film magnetic head 400 formed by the above-mentioned thin film manufacturing process, when a recording magnetic field is excited in the magnetic gap, a magnetic saturation occurs at the upper magnetic core layer 403 side before the lower magnetic core layer 402 side. More particularly, the magnetic saturation occurs on the way of reaching the opposed surface of the gap in the protruding part 403a disposed at the distal end of the upper magnetic core layer 403, and as its magnetomotive force increases, this magnetic saturation region is moved toward the gap opposed surface. In the thin film magnetic head 400, there occurs an inconvenience that, when the magnetic saturation becomes large on this gap opposed surface, the gradient of the recording magnetic field leaked from the magnetic gap is lowered (for example, refer to Patent Document 1: Jpn. Pat. Appln. Laid-Open Publication No. 6-28628).

Therefore, in Patent Document 1, it is proposed to prevent the gradient of the recording magnetic field leaked from the magnetic gap G' from becoming small by driving the region that the magnetic saturation occurs first when the magnetomotive force is raised on the way arriving from the distal end of the upper magnetic core layer 403 at the gap opposed surface by broadening the gap length of the thin film magnetic head 400 wider than the minimum recording magnetizing bit length.

On the other hand, in an HDD using this thin film magnetic head 400 as a recording head, as shown in FIG. 9 and FIG. 10, the thin film magnetic head 400 is placed on the rear end of the head slider 601 mounted at the distal end of a suspension 600, the thin film magnetic head 400 records a signal on a magnetic disc 602 while slightly the head slider 601 floats over the signal recording surface of the magnetic disc 602 rotating in a direction of arrows F in the drawings.

Here, the thin film magnetic head 400 is laminated in the order of the lower magnetic core layer 402, the non-magnetic layer 404 and the upper magnetic core layer 403 on the substrate finally becoming the head slider 601. The lower magnetic core layer 402 having a wide width is positioned at the preceding side (called a leading side) in the scanning direction of the head, and the upper magnetic core layer 403 having a narrow width is positioned at an opposite side (called a trailing side) to this leading side. Thus, in the thin film magnetic head 400, the recording bit normally recorded by the magnetic field generated from the upper magnetic core layer 402 of the leading side is rerecorded by the magnetic field generated from the upper magnetic core layer 403 of the trailing side to thereby form a recording track. Therefore, the track width of the recording track formed on the magnetic recording medium by this thin film magnetic head 400 strongly depends on the track width size $w_1'$ of the upper magnetic core layer 403.

As described above, in the thin film magnetic head 400 which is formed by the thin film manufacturing process, if the track width is intended to be narrowed to respond to the request of raising the recording density, the track width size $w_1'$ of the upper magnetic core layer 403 becoming narrower than the lower magnetic core layer 402 becomes more narrower.

However, if the track width size $w_1'$ of the protruding part 403a disposed at the distal end of the upper magnetic core layer 403 becomes excessively narrow, a magnetic saturation occurs on the way of reaching the gap opposed surface so that a phenomenon occurs, in which the concentration of the magnetic flux at the magnetic gap G' occurs and the magnetic flux is difficult to be distributed. In the thin film magnetic head 400, problems such as a reduction in the maximum recording magnetic field, a deterioration of a recording magnetic field distribution, a recording penetration due to a side fringing magnetic field, etc., occur. Further, problems such as a deterioration of an overwrite characteristics that is a characteristic in the case of overwriting, and a difficulty in a magnetic saturation operation of a high-frequency drive region.

More particularly, in this thin film magnetic head 400, as the track width size $w_1'$ of the upper magnetic core layer 403 becomes narrow, demerits are rather increased than the merits for bringing about the magnetic saturation on the way of arriving at the gap opposed surface of the upper magnetic core layer 403 described in the above-described Patent Document 1 (for example, refer to Patent Document 2: Jpn. Pat. Appln. Laid-Open Publication No. 2000-251219).

Therefore, in Patent Document 2, it is proposed that the upper magnetic core layer 403 is divided into a magnetic pole layer becoming a magnetic pole part, one end side of which approaches to a medium opposed surface, a first yoke layer as a yoke part connected to the other end side of the magnetic pole layer and a second yoke layer. Further, the width at the end of the medium opposed surface side of the magnetic pole layer is smaller than the width at the end of the medium opposed surface side of the connecting part of this magnetic pole layer to the first yoke layer, and the width of the magnetic pole layer at the end of the medium opposed surface side of the connecting part of this magnetic pole layer to the first yoke layer is larger than the width of the first yoke layer at the end of the medium opposed surface side of the connecting part of this magnetic pole layer to the first yoke layer.

In this case, the magnetic saturation in the gap opposed surface of the upper magnetic core layer 403 can be brought about without bringing about the magnetic saturation on the way of arriving at the gap opposed surface of the upper magnetic core layer 403.

However, according to the method described in Patent Document 2, the magnetic saturation occurs on the gap opposed surface of the upper magnetic core layer 403, while the amount of a magnetic flux passing through the upper magnetic core layer 403 having a narrow width is reduced. In order to prevent this, it is necessary to hold the sectional area (track width×film thickness) of the upper magnetic core layer 403 at least at a predetermined value. That is, if the track width size $w_1'$ of this upper magnetic core layer 403 is narrowed, the film thickness $s_1'$ must be increased proportional to the reciprocal number of the track width size $w_1'$.

Therefore, in the thin film magnetic head 400, as shown in FIG. 11, since the film thickness $s_1'$ must be increased by the part narrowed of the track width size $w_1'$ of the protruding part 403a disposed at the distal end of the upper magnetic core layer 403, in the thin film manufacturing process, the film forming time proportional to the film thickness of the upper magnetic core layer 403 is required. As a result, there occurs a problem that its manufacturing cost increases. Further, the larger the film thickness of the upper magnetic core layer 403 increases, the more the deterioration of the dimensional accuracy of the track width direction is caused. It becomes difficult to narrow the track width $w_1'$ of the upper magnetic core layer 403 corresponding to the high recording density (for example, refer to Patent Document 3: Jpn. Pat. No. 2574260).

Therefore, in Patent Document 3, it is proposed that the track width accuracy of the upper magnetic core layer 403 is improved by forming the upper magnetic core layer 403 in a two-layer structure of a first magnetic layer formed in a predetermined track width size and a second magnetic layer formed in a narrower track width size than the first magnetic layer.

However, in the method described in Patent Document 3, the dimensional accuracy of the track width direction of the upper magnetic core layer 403 is improved, but a problem that a manufacturing cost is increased due to the increase in the film thickness $s_1'$ of the above-mentioned upper magnetic core layer 403 cannot be solved.

Incidentally, as known references relating to the present invention, there are, for example, Patent Document 4: Jpn. Pat. Appln. Laid-Open Publication No. 2002-216313 and Patent Document 5: Jpn. Pat. Appln. Laid-Open Publication No. 2003-338012.

In these Patent Documents 4, 5, there is described a constitution that a plurality of recording head elements are sequentially laminated via insulating layers on a base by the above-mentioned thin film forming technique and the laminated recording head elements are deviated in a direction perpendicular to the laminating direction and disposed.

SUMMARY OF THE INVENTION

Accordingly, the present invention has been made in view of the above-mentioned conventional problems, can narrow a recording track formed on a magnetic recording medium and solves the problem of the deterioration of the dimensional accuracy of a track width direction in association with an increase in the thickness of the upper magnetic core layer while avoiding the problem of bringing about a magnetic saturation on the way of arriving at the gap opposed surface in association with the track narrowing of the upper magnetic core layer.

In order to achieve the objects, the magnetic head device according to the present invention comprises a plurality of recording head elements scanned to a magnetic recording medium. The plurality of recording head elements are sequentially laminated on a base through insulating layers and the laminated recording head elements are disposed to be deviated in a direction perpendicular to a laminating direction of the recording head elements so that, when the recording head elements are scanned to the magnetic recoding medium, the plurality of the recording head elements form a plurality of recording tracks aligned in a direction perpendicular to the scanning direction of the head. The plurality of recording head elements are formed so that the size in a track width direction of a first magnetic core layer positioned at a preceding side in the scanning direction of the head of a pair of magnetic core layers opposed via a magnetic gap becomes smaller than the size layer in a track width direction of a second magnetic core layer positioned at an opposite side to the first magnetic core in a medium opposed surface opposed to the magnetic recording medium and the ends of the first magnetic core layers of adjacent recording head elements are superposed by a predetermined width as seen from the laminating direction.

The rotary head device according to the present invention comprises a rotary drum, and a magnetic recording means mounted on this rotary drum and obliquely scanned to a running direction of a magnetic tape by a helical scan type. The magnetic recording means has a plurality of recording head elements scanned to the magnetic tape, these plurality of recording head elements are sequentially laminated on a base via insulating layers, the laminated recording head elements are disposed to be deviated in a direction perpendicular to the laminating direction so that when the recording head elements are scanned to the magnetic tape, the plurality of recording head elements form a plurality of recording tracks aligned in a direction perpendicular to the scanning direction of the head. Further, the plurality of recording head elements are formed such that the size in a track width direction of a first magnetic core layer positioned at the preceding side in the scanning direction of the head of a pair of magnetic core layers opposed via the magnetic gap becomes smaller than the size in a track width direction of a second magnetic core layer positioned at its opposite side in the medium opposed surface opposed to the magnetic tape, and the ends of the first magnetic core layers of the adjacent recording head elements are disposed to be superposed by a predetermined width as seen from the laminating direction.

The magnetic tape device according to the present invention comprises a tape running means for running a magnetic tape, and a magnetic recording means for recording a signal to the magnetic tape run by the tape running means, in which the magnetic recoding means has a plurality of recording head elements scanned to the magnetic tape, these plurality of recording head elements are sequentially laminated on a base via insulating layers, the laminated recording head elements are disposed to be deviated in a direction perpendicular to the laminating direction so that when the recording head elements are scanned to the magnetic tape, the plurality of recording head elements form a plurality of recording tracks aligned in a direction perpendicular to the scanning direction of the head, the plurality of recording head elements are formed such that the size in a track width direction of a first magnetic core layer positioned at the preceding side in the scanning direction of the head of a pair of magnetic core layers opposed via a magnetic gap becomes smaller than the size in the track width direction of a second magnetic core layer positioned at its opposite side in the medium opposed surface opposed to the magnetic tape, and the ends of the first magnetic core layers of the adjacent recording head elements are disposed to be superposed by a predetermined width as seen from the laminating direction.

The magnetic disc device according to the present invention comprises a disc rotating means for rotatably driving a magnetic disc; and a magnetic recording means for recording a signal to the magnetic disc rotatably driven by the disc rotating means, in which the magnetic recoding means has a plurality of recording head elements scanned to the magnetic disc, these plurality of recording head elements are sequentially laminated on a base via insulating layers, the laminated recording head elements are disposed to be deviated in a direction perpendicular to the laminating direction so that when the recording head elements are scanned to the magnetic disc, the plurality of recording head elements form a plurality of recording tracks aligned in a direction perpendicular to the scanning direction of the head, the plurality of recording head elements are formed such that the size in a track width direction of a first magnetic core layer positioned at the preceding side in the scanning direction of the head of a pair of magnetic core layers opposed via a magnetic gap becomes smaller than the size in a track width direction of a second magnetic core layer positioned at its opposite side in the medium opposed surface opposed to the magnetic disc, and the ends of the first magnetic core layers of the adjacent recording head elements are disposed to be superposed by a predetermined width as seen from the laminating direction.

The magnetic recording method according to the present invention comprises the steps of sequentially laminating a plurality of recording head elements scanned to a magnetic recording medium on a base via insulating layers, and disposing the laminated recoding head elements to be deviated in a direction perpendicular to the laminating direction, such that when the plurality of recording head elements form a plurality of recording tracks aligned in a direction perpendicular to the scanning direction of the head, at the time of scanning the recording head elements, the plurality of recording head elements are formed such that the size in a track width direction of first magnetic core layer of a pair of magnetic core layers opposed via a magnetic gap becomes smaller than the size in a track width direction of a second magnetic core layer, and the ends of the first magnetic core layers of the adjacent recording head elements are disposed to be superimposed by a predetermined width as seen from the laminating direction, and positioning the first magnetic core layers at the preceding side in the scanning direction of the head when the plurality of recording head elements are scanned to the magnetic recording medium.

In the present invention as described above, the plurality of recording head elements form the plurality of recording tracks aligned in a direction perpendicular to the scanning direction of the head to the magnetic recording medium, the recording track written next on the recording track previously written is overwritten by a predetermined width and thereby recording tracks narrower than the track widths of the recording tracks formed by the respective recording head elements can be formed accurately on the magnetic recording medium.

On the other hand, in addition to that the track width of the recording track formed on the magnetic recording medium is narrowed, the sizes of the first magnetic core layers of the respective recording head elements can be increased. Therefore, a magnetic saturation can be generated on the gap opposed surface of the first magnetic core layer without generating a magnetic saturation on the midway of reaching the gap opposed surfaces of the first magnetic core layer. Thus, in the plurality of the recording head elements, a recording magnetic field having a large magnetic field intensity can be generated by a smaller magnetomotive force.

Further, the sectional area of the first magnetic core layer must be maintained constantly. By increasing the size of the first magnetic core layer in the track width direction, the size of the first magnetic core layer, that is, the film thickness can be reduced. Thus, the deterioration of the dimensional accuracy in the track width direction can be prevented, a manufacturing process can be facilitated, and a manufacturing cost can be reduced.

Further, the magnetic saturation is generated by the first magnetic core layer on the gap opposed surface by increasing the size of the first magnetic core layer in the track width direction. However, the magnetic saturation on the gap opposed surface of the second magnetic core layer does not become remarkable as the magnetic saturation of the first magnetic core layer. Therefore, the recording bit recorded by the recording magnetic field generated in the first magnetic core layer is rerecorded by the recording magnetic field generated in the second magnetic core layer by positioning the first magnetic core layers of the respective recording head elements at the preceding side in the scanning direction of the head. Thus, the deterioration of the gradient of the recording magnetic field leaked from the magnetic gap can be suppressed while increasing the recording magnetic field intensity.

BRIEF DESCRIPTION OF THE DRAWINGS

FIG. 20A shows when the size of the first magnetic core layer in the track width direction is 2 μm, FIG. 20B shows when the size of the first magnetic core layer in the track width direction is 3 μm, and FIG. 20C shows when the size of the first magnetic core layer in the track width direction is 2 μm;

DETAILED DESCRIPTION OF THE PREFERRED EMBODIMENTS

A magnetic head device, a rotary head device, a magnetic tape device, and a magnetic disc device and a magnetic recording method to which the present invention is applied will be described in greater detail with reference to the accompanying drawings.

The drawings used in the following description show the case that the part becoming the feature is shown in an enlarged manner for the feature to be easily understandable, and hence the dimensional ratio of the respective constituting elements are not always the same as the actual case.

First, the magnetic head device to which the present invention is applied and the magnetic recording method using the same will be described.

Figure 1:
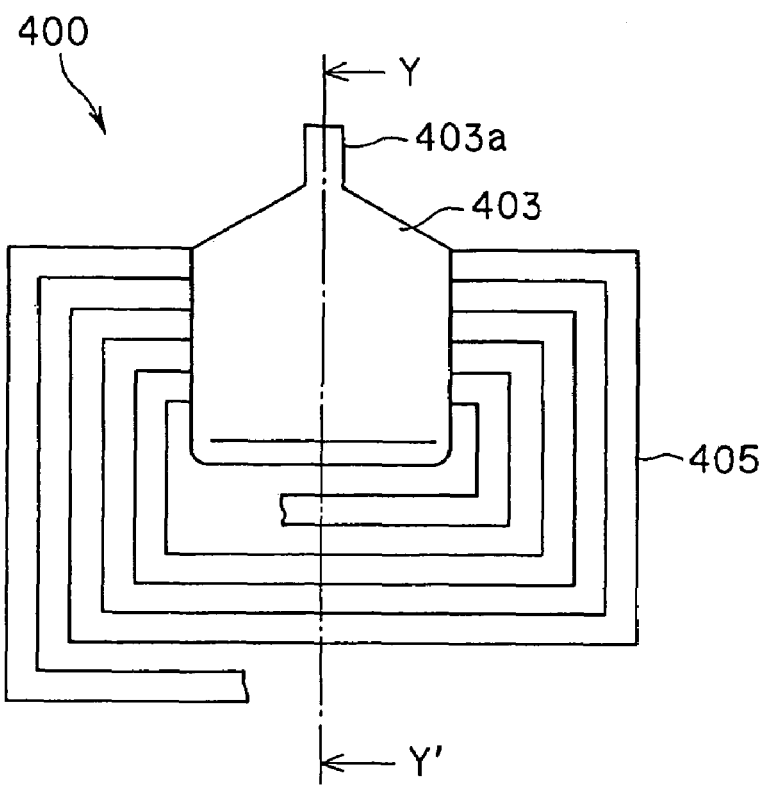
FIG. 1 is a plan view showing the configuration of a conventional thin film magnetic recording head.
Figure 2:
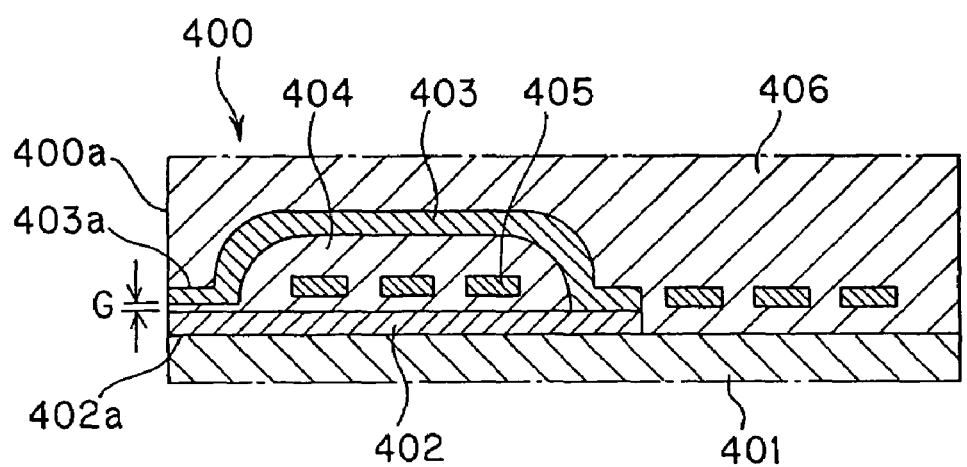
FIG. 2 is a sectional view taken along a line Y-Y' in FIG. 1.
Figure 3:
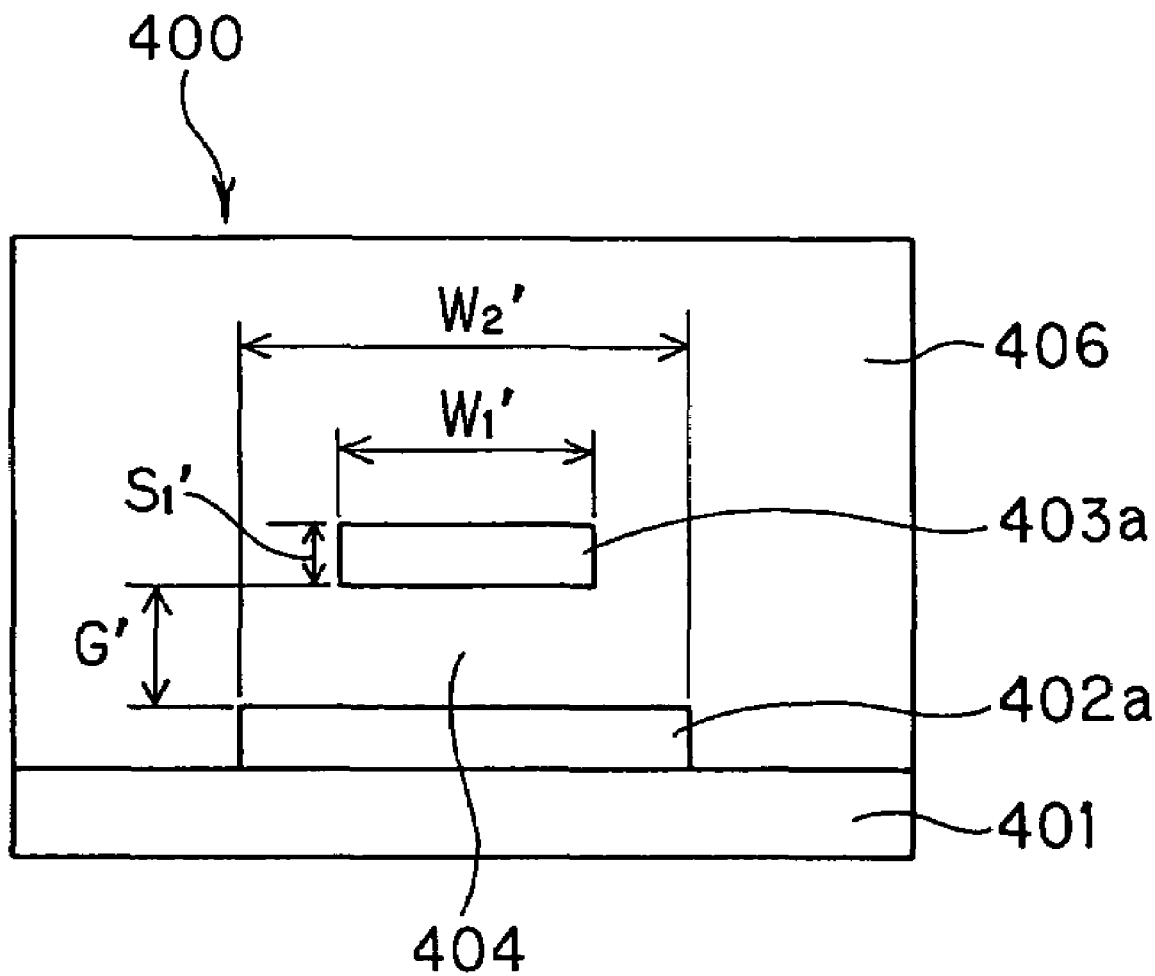
FIG. 3 is an end view showing the thin film magnetic recording head in FIG. 1 as seen from a medium opposed surface.
Figure 4:
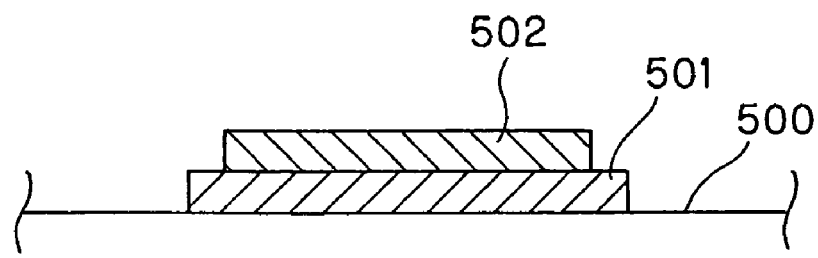
FIG. 4 is a sectional view showing the state that a layer having a narrow width is deposited on a layer having a wide width in a thin film manufacturing process.
Figure 5:
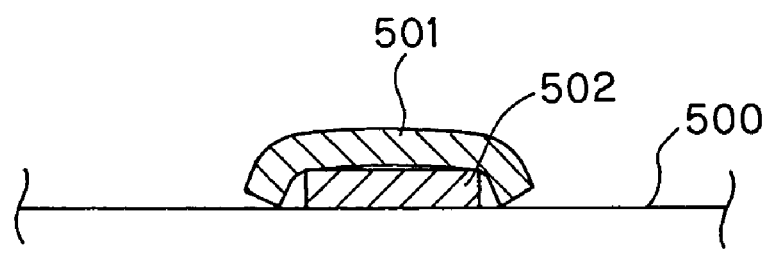
FIG. 5 is a sectional view showing the state that a layer having a wide width is deposited on a layer having a narrow width in the thin film manufacturing process.
Figure 6:
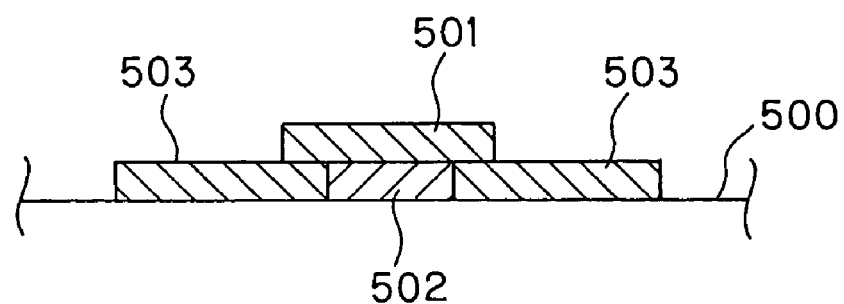
FIG. 6 is a sectional view showing the state that layers having the same film thickness are deposited on the both sides of a layer having a narrow width in the thin film manufacturing process shown in FIG. 5.
Figure 7:
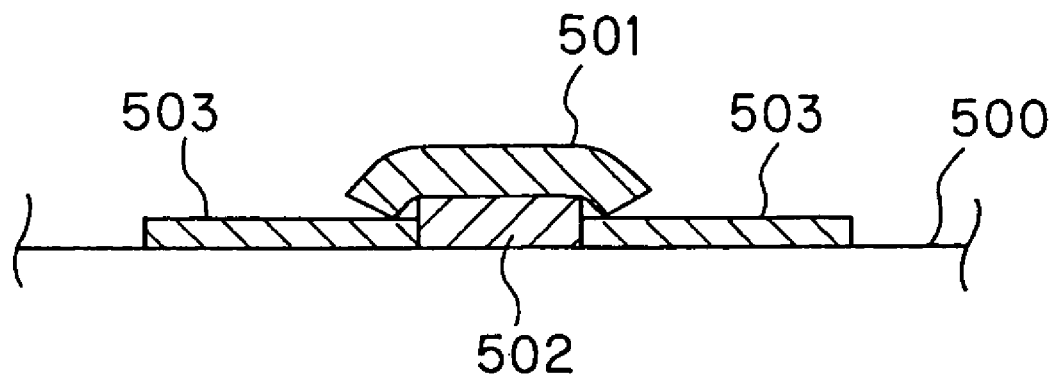
FIG. 7 is a sectional view showing the state that a layer having a thinner film thickness than the layer having a narrow width is deposited in the thin film manufacturing process shown in FIG. 6.
Figure 8:
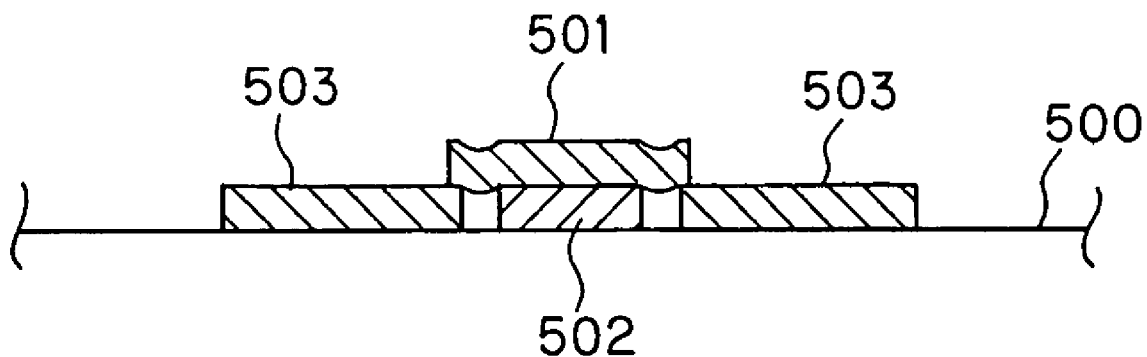
FIG. 8 is a sectional view showing the state that a gap is generated between the layer having a narrow width and layers formed on the both sides of the layer in the thin film manufacturing process shown in FIG. 6.
Figure 9:
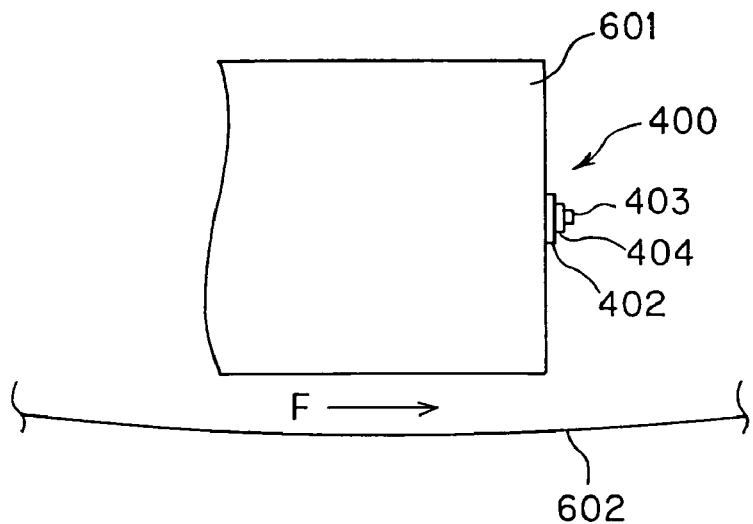
FIG. 9 is a plan view showing an essential part of a conventional HDD in an enlarged manner.
Figure 10:
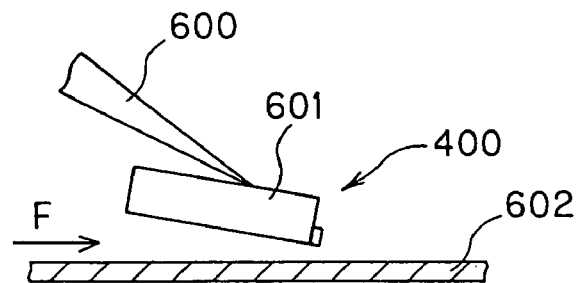
FIG. 10 is a side view showing the essential part of the conventional HDD in an enlarged manner.
Figure 11:
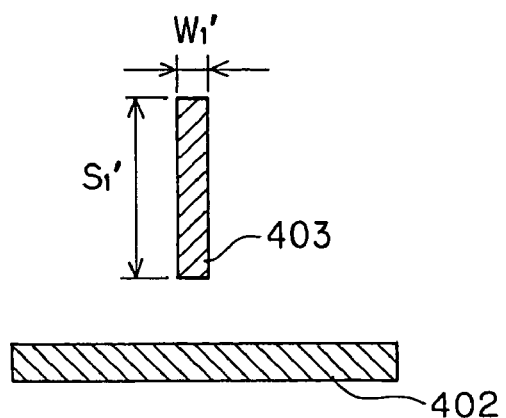
FIG. 11 is an end view showing the state that the thickness of an upper magnetic core layer of the thin film magnetic head shown in FIG. 1 becomes larger than the size in a track width direction.
Figure 12:
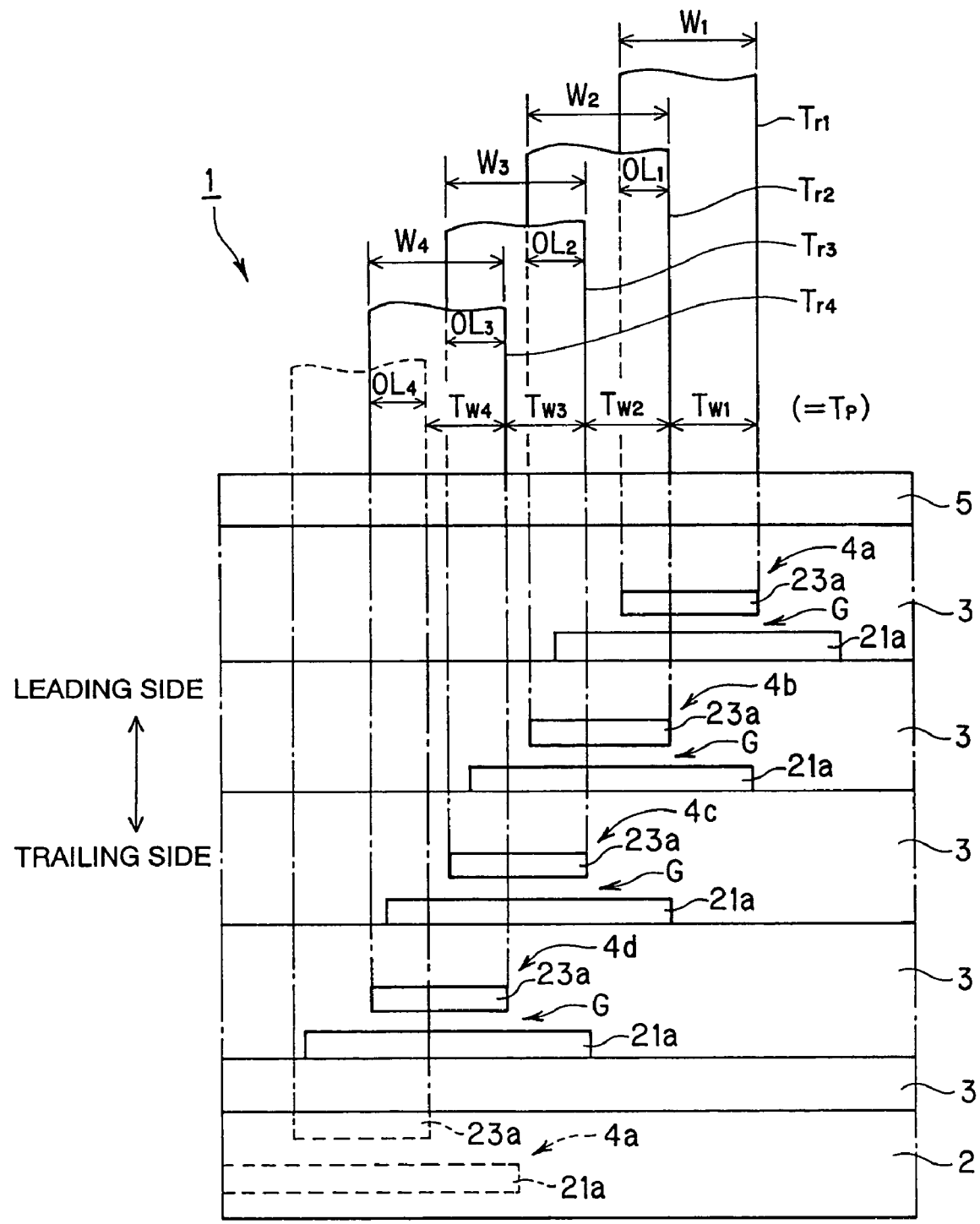
FIG. 12 is an end view showing a magnetic head device to which the present invention is applied as seen from a medium opposed surface.
Figure 13:
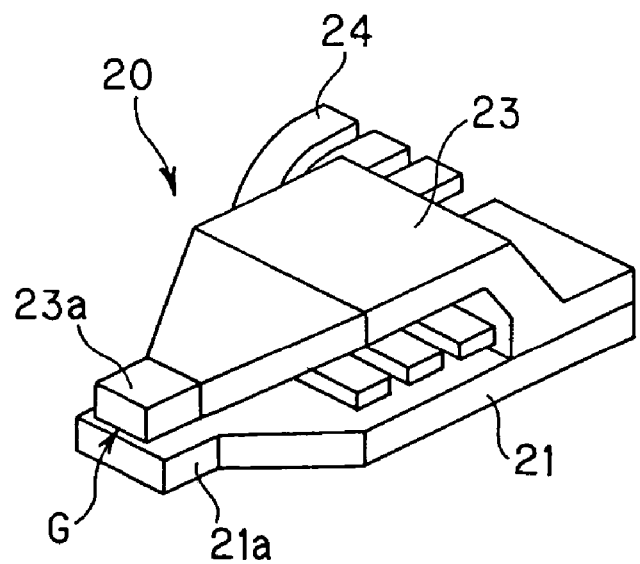
FIG. 13 is an oblique view of an essential part showing the configuration of a recording head element.
Figure 14:
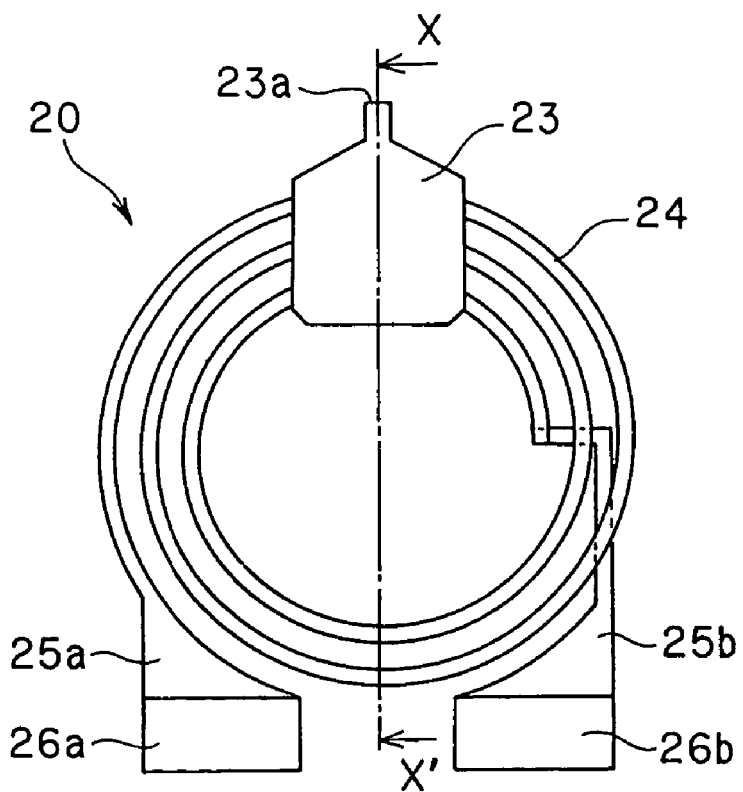
FIG. 14 is a plan view showing the configuration of the recording head element.
Figure 15:
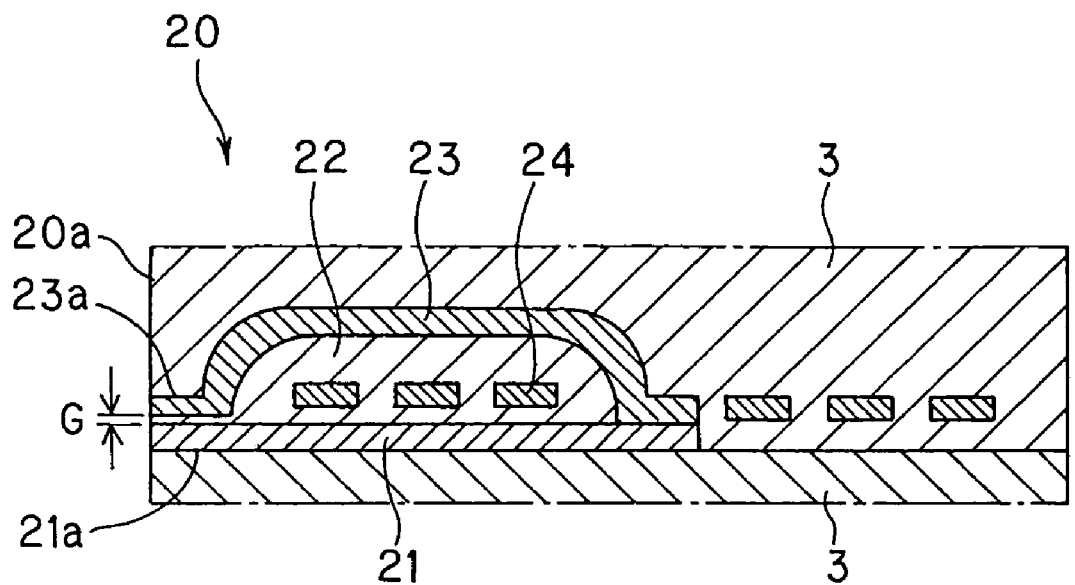
FIG. 15 is a sectional view taken along a line X-X' in FIG. 14.

As shown in FIG. 12, a magnetic head device 1 to which the present invention is applied is so-called a multi-thin film magnetic recording head having a structure that a plurality of recording head elements 4 are sequentially laminated on a first non-magnetic substrate 2 becoming a base through insulating layers 3 by a thin film forming technique such as, for example, a plating method, a sputtering method, an ion milling method, and a second non-magnetic substrate 5 is adhered thereon via insulating layers 3. Incidentally, the number of the laminated recording head elements 4 is arbitrary. Here, 4-channel multi-thin film magnetic recording head having four recording head elements 4a, 4b, 4c and 4d will be described as an example.

The plurality of recording head elements 4a, 4b, 4c and 4d are of inductive type thin film magnetic head 20 shown in FIG. 13 to FIG. 16. Since this thin film magnetic head 20 is formed with the respective constituting elements by the above-mentioned thin film forming technique, a track can be narrowed, and further higher recording density of a magnetic recording medium can be dealt with.

More particularly, the thin film magnetic head 20 is sequentially laminated in the order of the first non-magnetic substrate 2, a lower magnetic core layer 21, a non-magnetic layer 22, and an upper magnetic core layer 23. The lower magnetic core layer 21 and the upper magnetic core layer 23 have protruding parts 21a, 23a approaching to a medium opposed surface 20a opposed to the magnetic recording medium. These protruding parts 21a, 23a are opposed to each other via the non-magnetic layer 22 to thereby form a magnetic gap G of a minute space on these opposed surfaces. Thus, the thin film magnetic head 20 can narrow a recording magnetic field leaked from this magnetic gap G in a track width direction, and a fine recording bit can be recorded on the recording track of the magnetic recording medium.

On the other hand, the lower magnetic core layer 21 and the upper magnetic core layer 23 are connected at the other end spaced in a depth direction from the medium opposed surface 20a to form a magnetic path. A thin film coil 24 wound at a back gap of this connecting part as a center is provided in the state being embedded in the non-magnetic layer 22 between the lower magnetic core layer 24 and the upper magnetic core layer 25.

The end of the inner peripheral side and the end of the outer peripheral side of this thin film coil 24 are respectively connected to one ends of lead conductors 25a, 25b extended toward an opposite side to the medium oppose surface 20a. External connection terminals 26a, 26b for connecting to an external circuit for supplying a current in response to a recording signal to the thin film coil 24 are respectively provided at the other ends of the lead conductors 25a, 25b.

Incidentally, this magnetic head device 1 can be formed in a structure that magnetic shielding layer for magnetically shielding between adjacent recording head elements 4 is interposed between the respective recording head elements 4a, 4b, 4c and 4d.

The plurality of the recording head elements 4a, 4b, 4c, 4d composed of the above-mentioned thin film magnetic head 20 are formed so that the size $w_1$ in the track width direction of the protruding part 23a of the upper magnetic core layer 23 of a pair of the magnetic core layers 21 and 23 opposed via the magnetic gap G is smaller than the size $w_2$ in the track width direction of the protruding part 21a of the lower magnetic core layer 21 in the medium opposed surface 20a opposed to the magnetic recording medium and larger than the track widths $Tw_1$, $Tw_2$, $Tw_3$, $Tw_4$ of the recording tracks $Tr_1$, $Tr_2$, $Tr_3$ and $Tr_4$ formed on a magnetic recording medium to be described later. Further, these recording head elements 4a, 4b, 4c and 4d are deviated in a direction perpendicular to its laminating direction, that is, in a track width direction, and disposed so that the protruding parts 23a of the upper magnetic core layer 23 of adjacent heads are superposed in predetermined widths $OL_1$, $OL_2$, $OL_3$ and $OL_4$ as seen from a laminating direction.

In a magnetic recording method using the magnetic head device 1 composed as described above, as shown in FIG. 12, when the magnetic head device 1 is scanned to the magnetic recording medium, the upper magnetic core layers 23 of the respective recording head elements 4a, 4b, 4c and 4d are disposed to be positioned at the side preceding from the lower magnetic core layer 21.

That is, in this magnetic head device 1, the protruding parts 23a of the upper magnetic core layers 23 in a plurality of recording head elements 4a, 4b, 4c and 4d scanned to the magnetic recording medium form first magnetic core layers 23a positioned at the preceding side (called leading side) in the scanning direction of the head, and the protruding parts 21a of the lower magnetic core layers 21 form second magnetic core layers 21a positioned at an opposite side (called trailing side) to the leading side.

In this magnetic head device 1, when currents in response to a recording signal are supplied to the thin film coils 24 of the plurality of recording head elements 4a, 4b, 4c and 4d from the external circuit, magnetic flux flows to the pair of the magnetic core layers 21, 23 by the magnetic field generated from the thin film coils 24, and a recording magnetic field is generated in the magnetic gap G. This recording magnetic field is applied to a magnetic tape 3 to form a recording track in which a recording bit in response to the recording signal is recorded.

In this magnetic head device 1, when scanned to the magnetic recording medium, these recording head elements 4a, 4b, 4c, 4d form a plurality of recording tracks $Tw_1$, $Tw_2$, $Tw_3$ and $Tw_4$ aligned in a direction perpendicular to the scanning direction of the head.

More particularly, in this magnetic head device 1, the first magnetic core layer 23a of the recording head element 4n positioned at n-th (n indicates an integer of 1 or more) from the preceding side to the scanning direction of the head as seen from the laminating direction, and the second magnetic core layer 21a of the recording head element 4n+1 positioned at (n+1)-th are disposed to be superposed (overlapped) by a predetermined width $OL_n$.

Therefore, since the recording track $Tr_1$ formed by the most preceding first recording head element 4a is formed in width $w_1$ substantially coincident with the size $w_1$ of the protruding part (first magnetic core layer) 23a of the above-mentioned upper magnetic core layer 23 in the track width direction and is then overwritten in a predetermined width $OL_1$ by the recording track $Tr_2$ formed by second recording head element 4b, the track width $Tw_1$ of the recording track $Tr_1$ finally recorded by this first recording head element 4a becomes a value shown by following equation (1):

$$Tw_1 = W_1 - OL_1 \quad (1)$$

Similarly, since the recording tracks $Tr_2$, $Tr_3$ formed by second and third recording head elements 4b, 4c are formed in widths $W_2$, $W_3$ substantially coincident with the size $w_1$, of the protruding part (first magnetic core layer) 23a of the above-mentioned upper magnetic core layer 23 in the track width direction and are then overwritten by predetermined widths $OL_2$, $OL_3$ by the recording tracks $Tr_3$, $Tr_4$ formed by the third and fourth recording head elements 4c, 4d, the track widths $Tw_2$, $Tw_3$ of the recording tracks $Tr_2$, $Tr_3$ finally recorded by these second and third recording head elements 4b, 4c become values shown by following equations (2) and (3):

$$Tw_2 = W_2 - OL_2 \quad (2)$$

$$Tw_3 = W_3 - OL_3 \quad (3)$$

Further, since the recording track $Tr_4$ formed by fourth recording head element 4d is formed in width $W_4$ substantially coincident with the size $w_1$ of the protruding part (first magnetic core layer) 23a of the above-mentioned upper magnetic core layer 23 in the track width direction and is then overwritten by predetermined width $OL_4$ by the recording track $Tr_1$ formed by the first recording head element 4a of the next scanned magnetic head device 1, the track width $Tw_4$ of the recording track $Tr_4$ finally recorded by this fourth recording head element 4d becomes a value shown by following equation (4):

$$Tw_4 = W_4 - OL_4 \quad (4)$$

Here, in order that the track widths $Tw_1$, $Tw_2$, $Tw_3$, $Tw_4$ of the recording tracks finally recorded by the respective recording head elements 4a, 4b, 4c and 4d are a track width Tw coincident with each other, it is necessary to satisfy relational equations (5), (6), (7) and (8) shown below.

$$W_1 = Tw - OL_1 \quad (5)$$

$$W_2 = Tw - OL_2 \quad (6)$$

$$W_3 = Tw - OL_3 \quad (7)$$

$$W_4 = Tw - OL_4 \quad (8)$$

More particularly, a value obtained by subtracting the size $OL_n$ of the part superposed as seen from the laminating direction of the first magnetic core layer 23a of the recording head element 4n positioned at n-th and the first magnetic core layer 23a of the recording head element 4n+1 positioned at n+1-th from the size Wn of the first magnetic core layer 23a of the recording head element 4n positioned at n-th in the track width direction can become a value coincident at all the recording head elements 4a, 4b, 4c and 4d by satisfying this relational equation. Incidentally, in this case, the recording tracks $Tr_1$, $Tr_2$, $Tr_3$ and $Tr_4$ formed on the magnetic recording medium are formed in width in which the track widths $Tw_1$, $Tw_2$, $Tw_3$ and $Tw_4$ are coincident with a track pitch Tp.

As described above, in this magnetic head device 1, a plurality of recording head elements 4a, 4b, 4c and 4d form a plurality of recording tracks $Tr_1$, $Tr_2$, $Tr_3$ and $Tr_4$ aligned in a direction perpendicular to the scanning direction of the head to the magnetic recording medium, the recording track $Tr_{n+1}$ written next on the recording track $Tr_n$ previously written is overwritten by a predetermined width $OL_n$, and thereby recording tracks $Tw_1$, $Tw_2$, $Tw_3$, $Tw_4$ narrower than the track widths $W_1$, $W_2$, $W_3$, $W_4$ of the recording track formed by the respective recording head elements 4a, 4b, 4c, 4d can be formed accurately on the magnetic recording medium.

On the other hand, in this magnetic head device 1, in addition to that the track width $Tw_n$ of the recording track $Tr_n$ formed on the magnetic recording medium is narrowed, the sizes $w_1$ of the first magnetic core layers 23a of the respective recording head elements 4a, 4b, 4c and 4d can be increased. Therefore, a magnetic saturation can be generated on the gap opposed surface of the first magnetic core layer 23a without generating a magnetic saturation on the midway of reaching the gap opposed surfaces of the first magnetic core layers 23a. Thus, in the recording head elements 4a, 4b, 4c, 4d, a recording magnetic field having a large magnetic field intensity can be generated by a smaller magnetomotive force.

Figure 16:
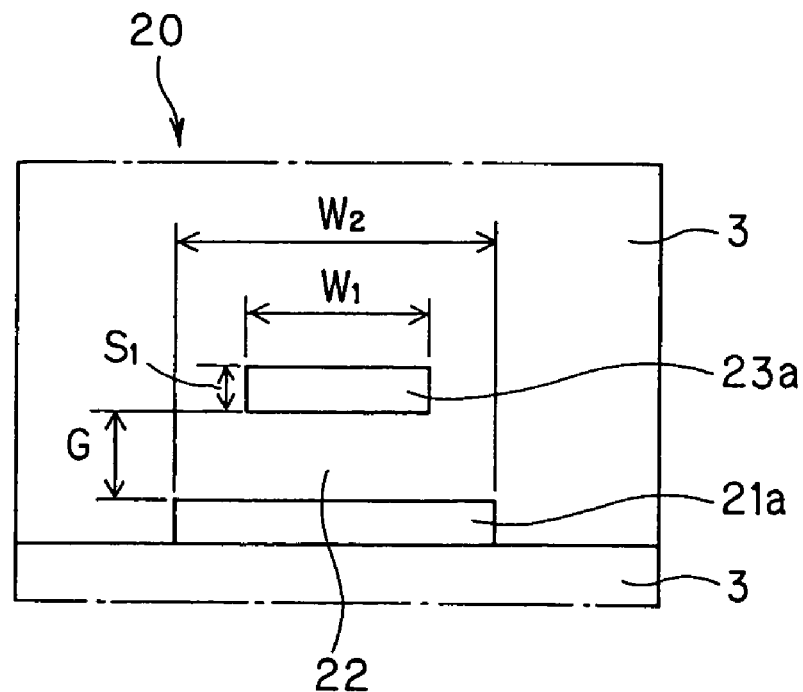
FIG. 16 is an end view showing the recording head element as seen from the medium opposed surface.

Further, in this magnetic head device 1, as shown in FIG. 16, the size (thickness) $s_1$ of the first magnetic core layer 23a can be reduced reversely by broadening the size $w_1$ of the first magnetic core layer (the protruding part of the upper magnetic core layer 23) 23a in the track width direction. That is, in the thin film magnetic head 20 for constituting the respective recording head elements 4a, 4b, 4c, 4d, a substantially rectangular shape in which the size $w_1$ of the protruding part 23a of the upper magnetic core layer 23 in the track width direction is made longer than the size (thickness) $s_1$ in the laminating direction can be formed. Thus, in the magnetic head device 1, the deterioration of the track width accuracy can be prevented, a manufacturing process can be facilitated, and a manufacturing cost can be reduced.

Further, in this magnetic head device 1, the magnetic saturation is generated by the first magnetic core layer 23a on the gap opposed surface by increasing the size $w_1$ of the first magnetic core layer 23a in the track width direction. The magnetic saturation on the gap opposed surface of the second magnetic core layer 21a does not become remarkable as the magnetic saturation of the first magnetic core layer 23a. Therefore, the recording bit recorded by the recording magnetic field generated in the preceding first magnetic core layer 23a is rerecorded by the recording magnetic field generated in the succeeding second magnetic core layer 21a by positioning the first magnetic core layers 23a of the respective recording head elements 4a, 4b, 4c, 4d at the preceding side in the scanning direction of the head. Thus, the deterioration of the gradient of the recording magnetic field leaked from the magnetic gap G can be suppressed while increasing the recording magnetic field intensity.

Figure 17:
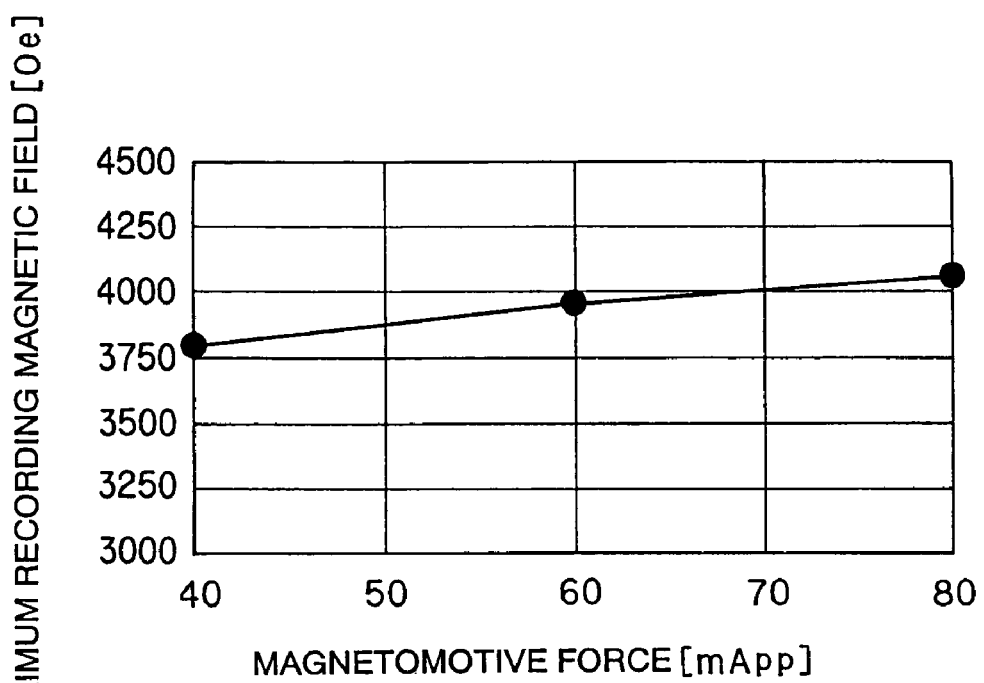
FIG. 17 is a characteristic diagram showing the relationship between a magnetomotive force and the maximum value of a recording magnetic field intensity.

Here, the calculated result of the maximum value of the recording magnetic field intensity to the magnetomotive force of the thin film magnetic head 20 by a simulation is shown in FIG. 17.

Incidentally, in the graph shown in FIG. 17, NiFe is used for the pair of magnetic core layers 21, 23 of the thin film magnetic head 20, the size $w_1$ of the first magnetic core layer (the protruding part of the upper magnetic core layer 23) 23$a$ in the track width direction is 2 μm, the size (thickness) $s_1$ of the laminating direction is 2.5 μm, and the number of turns of the thin film coil 24 is 10 turns. Thus, the calculation is performed, and the maximum values of the respective recording magnetic field intensity when the magnetomotive force is 40, 60, and 80 mApp are obtained. Incidentally, the saturated magnetic flux density of NiFe is about 0.9 T (tesla).

From the graph shown in FIG. 17, it is understood that even when the magnetomotive force is increased from 40 mApp to 80 mApp, the maximum value of the recording magnetic field intensity is increased slightly by about 250 Oe. Therefore, for example, in order to set the maximum value of the recording magnetic field intensity to 4,000 Oe or more, the magnetomotive force of at least 70 mApp is required.

The reason why the increase in the maximum value of the recording magnetic field intensity to the increase in this magnetomotive force is slight, is because the sectional area ($w_1 \times s_1$) of the first magnetic core layer 23$a$ is reduced by shortening the size $w_1$ of the first magnetic core layer 23$a$ in the track width direction as compared with the thickness $s_1$. As a result, the magnetic saturation occurs on the way of reaching the gap opposed surface of the first magnetic core layer 23$a$.

Figure 18:
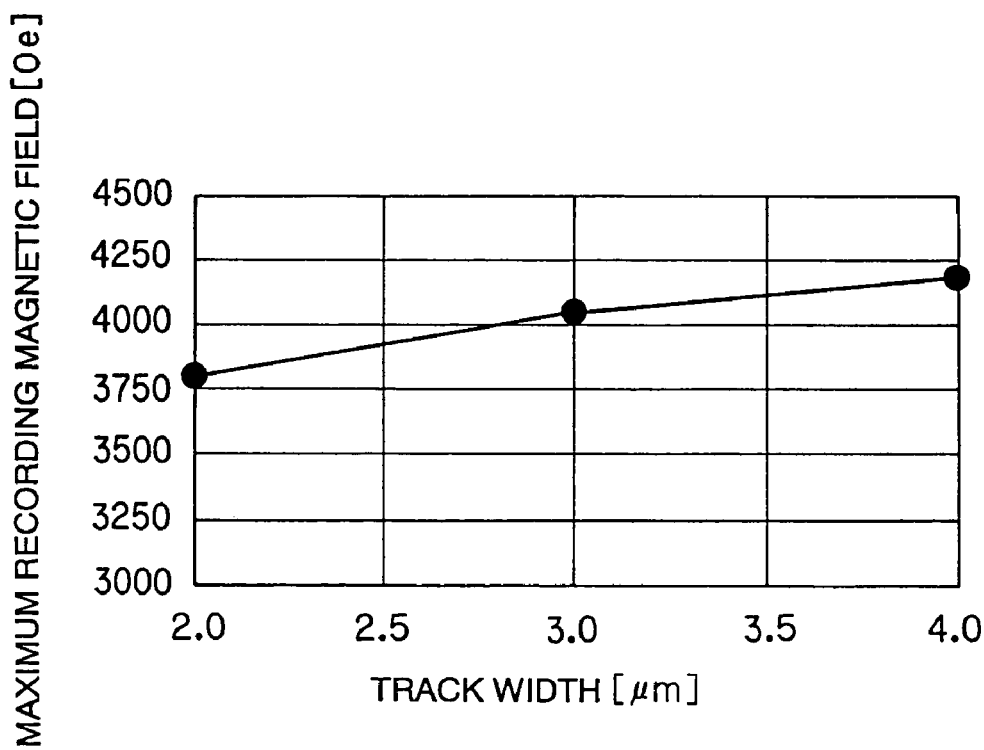
FIG. 18 is a characteristic diagram showing the relationship between the size of a first magnetic core layer in a track width direction and the maximum value of the recording magnetic field intensity.

Then, the calculation result by the simulation of the maximum value of the recording magnetic field intensity when the size $w_1$, of the first magnetic core layer 23$a$ in the track width direction is changed to 2, 3 and 4 μm while the magnetomotive force remains fixed to 40 mApp is shown in FIG. 18.

From the graph shown in FIG. 18, when the size $w_1$ of the first magnetic core layer 23$a$ in the track width direction is increased, it is understood that the increase in the maximum value of the recording magnetic field intensity becomes remarkable as compared with the increase in the maximum value of the recording magnetic field intensity to the magneomotive force shown in FIG. 17. For example, in order to set, for example, the maximum value of the recording magnetic field intensity to 4,000 Oe or more, the size $w_1$ of the first magnetic core layer 23$a$ in the track width direction may be increased from 2 μm to 3 μm while the magnetomotive force remains 40 mApp.

Therefore, in the above magnetic head device 1, since the sizes $w_1$ of the first magnetic core layers 23$a$ of the respective recording head elements 4$a$, 4$b$, 4$c$ and 4$d$ in the track width direction can be made longer than the size (thickness) $s_1$ of the laminating direction, a large recording magnetic field can be generated by small magnetomotive force. Thus, the power consumption of the respective recording head elements 4$a$, 4$b$, 4$c$ and 4$d$ can be suppressed to small values.

Figure 19:
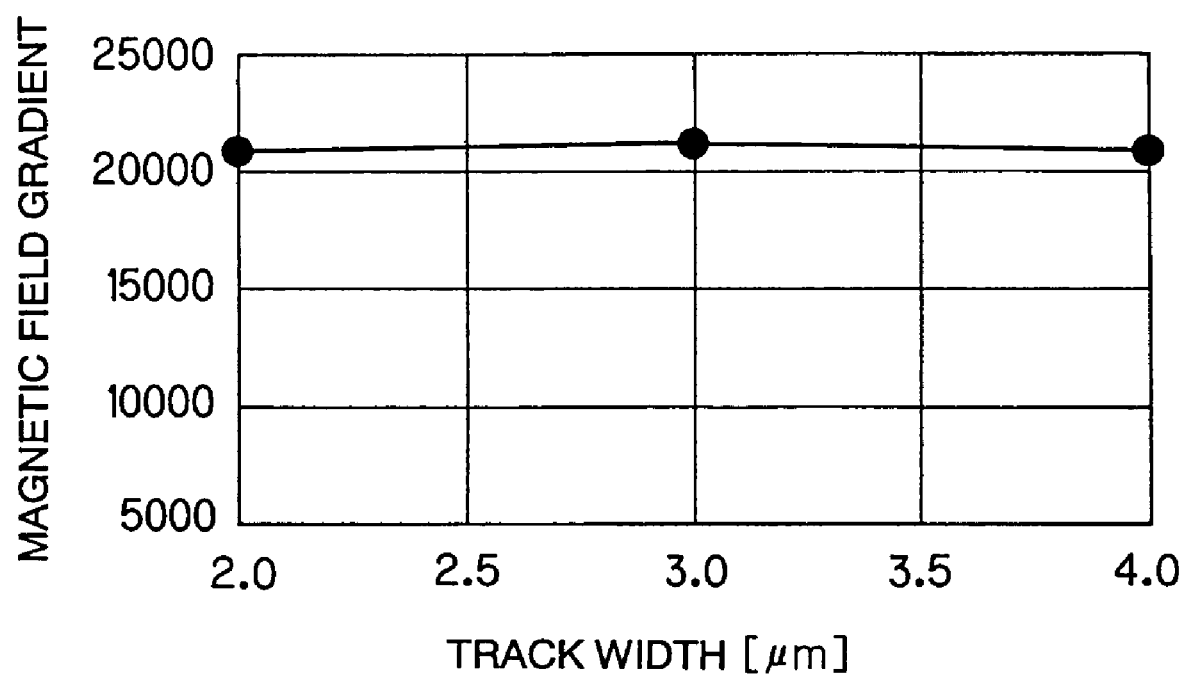
FIG. 19 is a characteristic diagram showing the relationship between the size of the first magnetic core layer in the track width direction and the magnetic gradient.

Then, the calculated result calculating by the simulation of the magnetic gradation when the recording magnetic field becomes 1,800 Oe as the size $w_1$ of the first magnetic core layer 23$a$ in the track width direction is changed to 2, 3 and 4 μm while the magnetomotive force remains fixed to 40 mApp, is shown in FIG. 19.

From the graph shown in FIG. 19, it is understood that, even when the size $w_1$ of the first magnetic core layer 23$a$ in the track width direction is increased, the magnetic gradation of the recording magnetic field is hardly degraded but becomes constant. This is different from the case described in Patent Document 1, and the magnetic gradient of the recording magnetic field depends more on the recording magnetic field generated by the lower magnetic core layer 21$a$ of the trailing side than on the recording magnetic field generated by the upper magnetic core layer 23$a$ of the leading side by positioning the first magnetic core layer 23$a$ at the leading side.

Figure 20A:
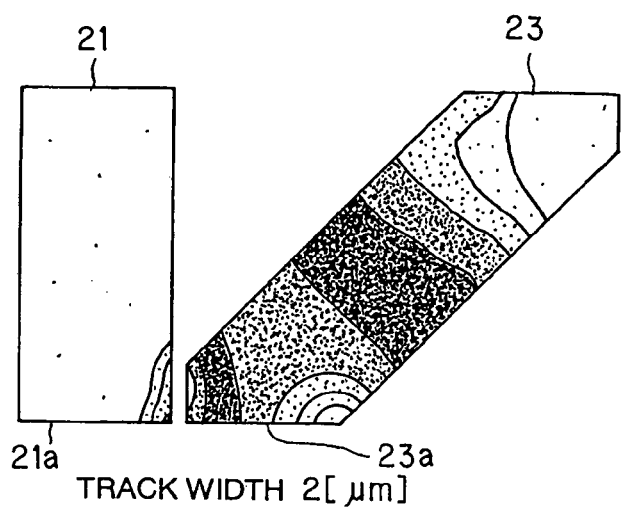
FIGS. 20A to 20C are views schematically showing a magnetic saturation in an interior near the gap opposed surface of the first magnetic core layer and a second magnetic core layer.
Figure 20B:
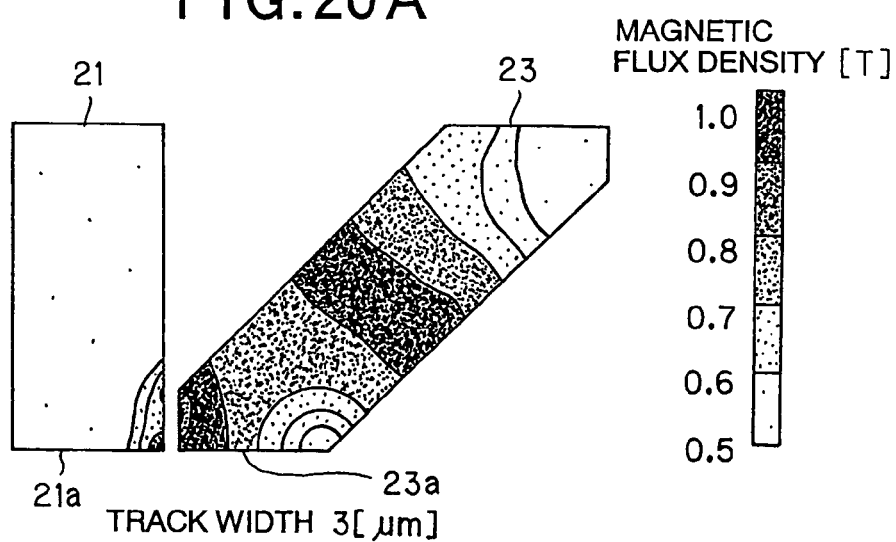
Figure 20C:
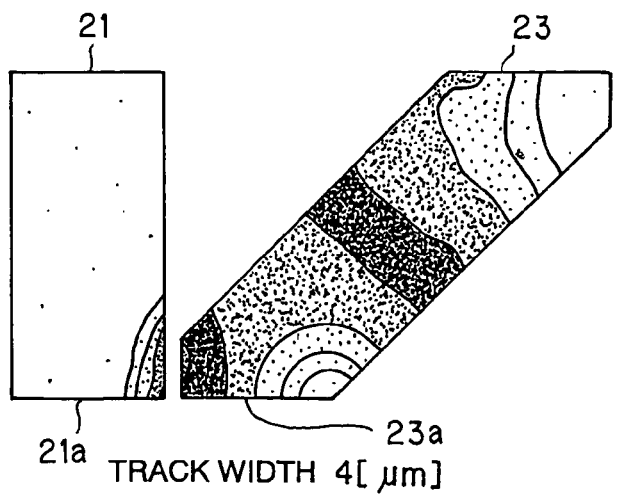

Subsequently, the calculation result calculating by the simulation of the magnetic saturation in the interior near the gap opposed surface of the first magnetic core layer 23$a$ and the second magnetic core layer 23$b$ as the size $w_1$ of the first magnetic core layer 23$a$ in the track width direction is changed to 2, 3 and 4 μm while the magnetomotive force remains fixed to 40 mApp, is schematically shown in FIG. 20.

From the result shown in FIG. 20, it is understood that the magnetic saturation generated on the way of reaching the gap opposed surface of the upper magnetic core layer 23$a$ is eliminated by increasing the size $w_1$ of the first magnetic core layer 23$a$ in the track width direction, and the magnetic saturation is increased on the gap opposed surface of the upper magnetic core layer 23$a$. That is, the magnetic saturation is generated on the gap opposed surface of the first magnetic core layer 23$a$ by increasing the size $w_1$ of the first magnetic core layer 23$a$ in the track width direction but the magnetic saturation on the gap opposed surface of the second magnetic core layer 21$a$ does not become remarkable as the magnetic saturation of the first magnetic core layer 23$a$.

Therefore, in the above-mentioned magnetic head device 1, the deterioration of the gradient of the recording magnetic field leaked from the magnetic gap G can be suppressed while increasing the recording magnetic field intensity by positioning the first magnetic core layers 23$a$ of the respective recording head elements 4$a$, 4$b$, 4$c$ and 4$d$ at the leading side.

Then, the rotary head device and the magnetic tape device in which the above-mentioned magnetic head device 1 is used as a magnetic recording means will be described.

Figure 21:
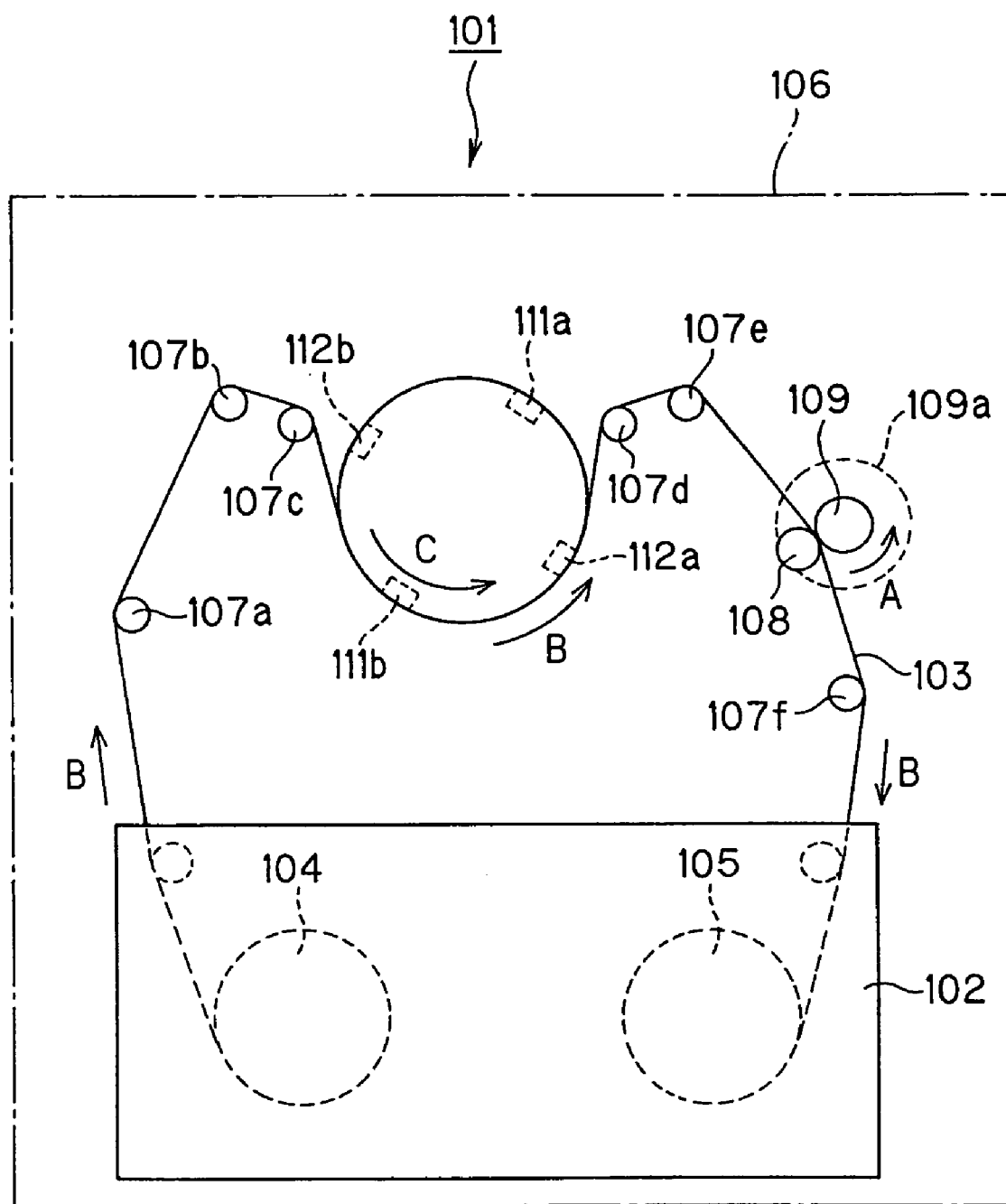
FIG. 21 is a plan view showing the configuration of a magnetic tape device to which the present invention is applied.

As shown in FIG. 21, the magnetic tape device 101 to which the present invention is applied records/reproduces an information signal on and from a magnetic tape 103 of a magnetic recording medium housed, for example, in a two-reel type tape cartridge 102 by a so-called helical scan system. The tape cartridge 102 is detachable in this magnetic tape device 101. Further, a supply reel 104 for supplying the magnetic tape 103 and a take-up reel 104 for winding the magnetic tape 103 supplied from this supply reel 104 are rotatably provided in the tape cartridge 102.

The magnetic tape device 101 comprises a device main body 106 in which the tape cartridge 102 is attached or detached. The device main body 106 has a plurality of guide rollers 107$a$ to 107$f$ for drawing the magnetic tape 103 around between the supply reel 104 and the take-up reel 105 at the loading time of the tape cartridge 102.

There are provided a pinch roller 108 engaged with the magnetic tape 103, a capstan 109 for holding the magnetic tape 103 together with this pinch roller 108, and a capstan motor 109$a$ for rotatably driving the capstan 109 as a tape running means between the guide roller 107e and the guide roller 107f. The magnetic tape 103 is run at a predetermined speed and tension in a direction of arrows B in FIG. 21 by rotatably driving the capstan 109 in a direction of an arrow A in FIG. 21 by the capstan motor 109a in the state that the magnetic tape 103 is sandwiched between the pinch roller 108 and the capstan 109. The rotary head device 110 to which the present invention is applied is provided between the guide roller 107c and the guide roller 107d.

Figure 22:
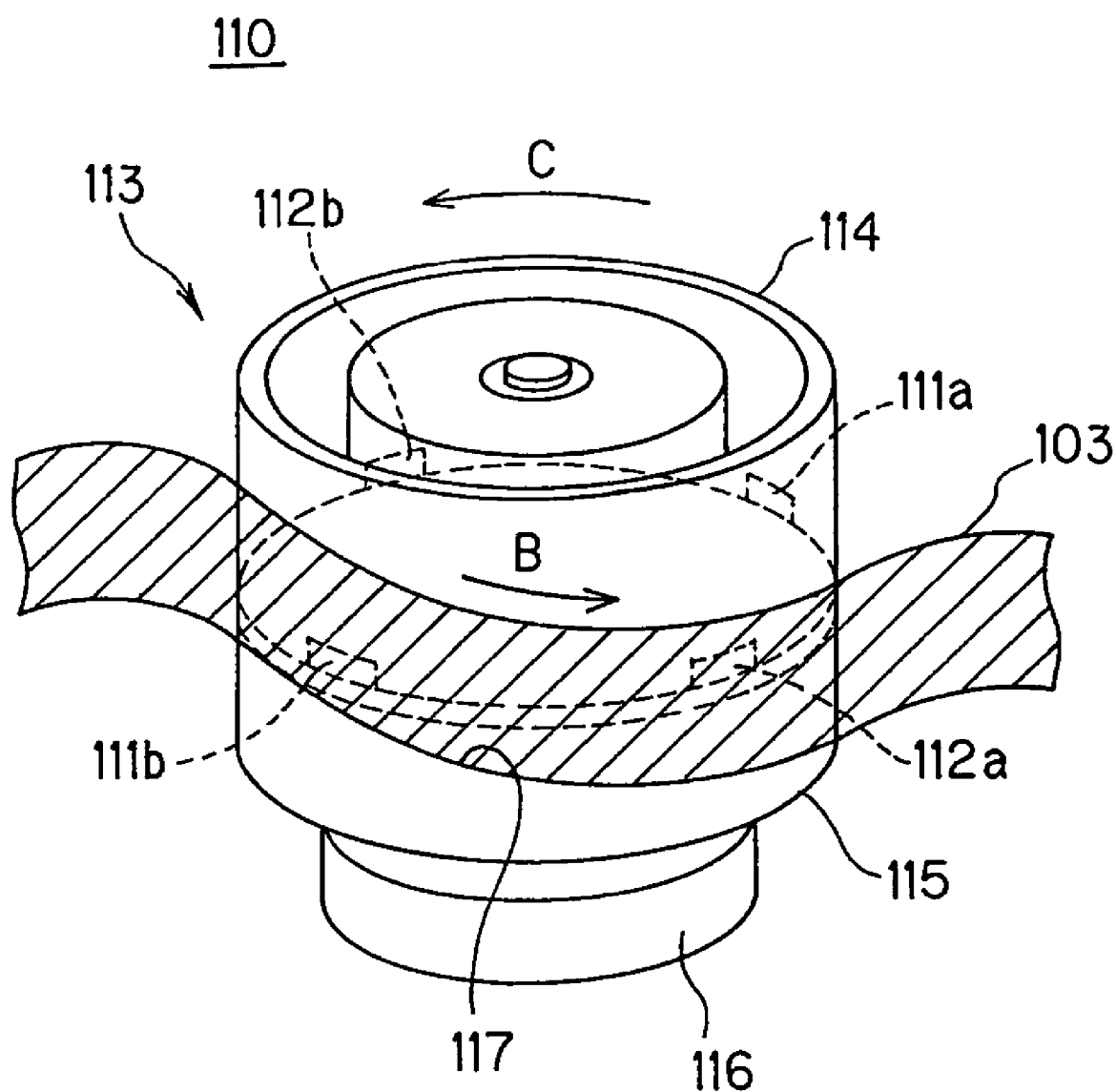
FIG. 22 is an oblique view showing the configuration of a rotary head device to which the present invention is applied.

This rotary head device 110 comprises, as shown in FIG. 21 and FIG. 22, a pair of recording heads 111a, 111b as a magnetic recording means, a pair of reproducing heads 112a, 112b as a magnetic reproducing means, and a head drum 113 mounting these recording heads and the reproducing heads. On the other hand, the magnetic tape 103 is drawn from the tape cartridge 102 by the above-mentioned plurality of guide rollers 107a to 107f is run in a direction of the arrows B in FIG. 22 in the state that the magnetic tape 103 is helically wound in an angular range of approximately 180° on this head drum 113.

More particularly, the head drum 113 has one set of a rotary drum 114 and a fixed drum 115 combined in a vertical direction, and a drive motor 116 for rotatably driving the rotary drum 114. The head drum 113 is disposed in the state slightly oblique to the base of the device main body 106 in such a manner that the central axes of the rotary drum 114 and the fixed drum 115 coincide with each other.

The fixed drum 115 for constituting a lower drum is fixedly supported to the base of the device main body 106. The fixed drum 115 has a leading guide 117 formed on the cylindrical outer peripheral surface thereof for guiding the magnetic tape 103. The magnetic tape 103 is run obliquely to the rotating direction of the rotary drum 114 along the leading guide 117.

On the other hand, the rotary drum 114 for constituting an upper drum is supported rotatably to the fixed drum 115 having a central axis coincident with the central axis of the rotary drum 114 and having substantially the same diameter thereof The rotary drum 114 is rotatably driven in a direction of arrows C in FIG. 21 and FIG. 22 by the drive motor 116 disposed under the fixed drum 115. A pair of recording heads 111a, 111b for recoding a signal on the magnetic tape 103 and a pair of reproducing heads 112a, 112b for reproducing the signal from the magnetic tape 103 are mounted on the outer periphery of the rotary drum 114 on the side opposed to the fixed drum 115.

The pair of the recording heads 111a, 111b are disposed oppositely to each other at the position where a central angle formed to the rotating center of the rotary drum 114 becomes 180°. These pair of the recording heads 111a, 111b are provided so that recording gaps (magnetic gaps) are provided from the outer peripheral surface of rotary drum 114 approaching to the exterior.

The above magnetic head device 1 is used for these pair of the recording heads 111a, 111b. More particularly, these pair of the recording heads 111a, 111b have, as shown in FIG. 12, the plurality of recording head elements 4a, 4b, 4c and 4d to be scanned to the magnetic tape 103. The plurality of the recording head elements 4a, 4b, 4c and 4d are sequentially laminated on the first non-magnetic substrate 2 via the insulating layers 3, and the second non-magnetic substrate 5 is adhered thereon via the insulating layers 3. The plurality of the recording head elements 4a, 4b, 4c and 4d are formed so that the size $w_1$ of the protruding part 23a of the upper magnetic core layer 23 in the track width direction of the pair of the magnetic core layers 21, 23 opposed via the magnetic gap G is smaller than the size $w_2$ of the protruding part 21a of the lower magnetic core layer 21 in the track width direction on the medium opposed surface opposed to the magnetic tape 103 and becomes larger than the track widths $Tw_1$, $Tw_2$, $Tw_3$ and $Tw_4$ of the recording tracks $Tr_1$, $Tr_2$, $Tr_3$ and $Tr_4$ formed on the magnetic tape to be described later. Further, these recording head elements 4a, 4b, 4c and 4d are disposed to be deviated in a direction perpendicularly crossed with its laminating direction, that is, in the track width direction so that the protruding parts 23a of the upper magnetic core layers 23 of the adjacent heads are superposed in predetermined widths $OL_1$, $OL_2$, $OL_3$ and $OL_4$ as seen from the laminating direction.

The magnetic gap G of the first and third recording heads 4a, 4c of the four recording head elements 4a, 4b, 4c and 4d for constituting the pair of recording heads 111a, 111b is disposed obliquely in response to a predetermined azimuth angle to the direction perpendicular to the scanning direction of the head. On the other hand, the magnetic gap of the second and fourth recording head elements 4b, 4d is disposed reversely to the first and third recording head elements 4a, 4c and obliquely in response to a predetermined azimuth angle to the direction perpendicular to the scanning direction of the head. That is, the first and third recording head elements 4a, 4c and the second and fourth recording head elements 4b, 4d are set so that the inclining direction of the azimuth angles thereof become reverse.

On the contrary, the pair of reproducing heads 112a, 112b are disposed, as shown in FIG. 21 and FIG. 22, oppositely to each other at the position where the central angle formed to the rotating centers of the rotary drums 14 becomes 180°. These pair of the reproducing heads 112a, 112b are disposed at the position deviated at 90° with respect to the pair of recording heads 111a, 111b. The pair of the reproducing heads 112a, 112b are provided with the reproducing gaps approaching from the outer peripheral surfaces of the rotary drums 14 to the exterior.

Figure 23:
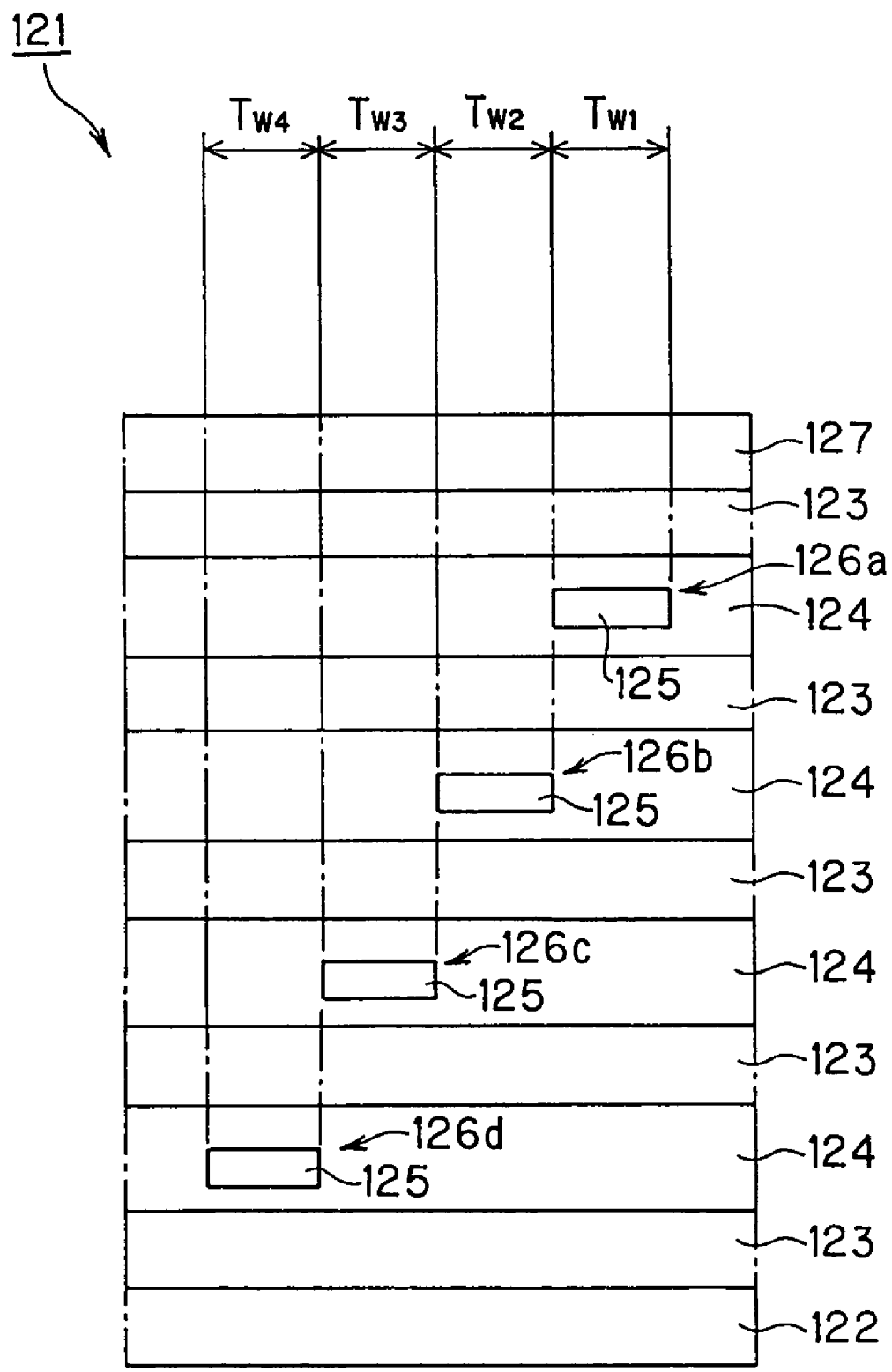
FIG. 23 is an end view showing a magnetic head device having a plurality of reproducing head elements as seen from the medium opposed surface.

A magnetic head device 121 shown in FIG. 23 is used for these pair of the reproducing heads 112a, 112b. The magnetic head device 121 is a so-called multi-thin film magnetic reproducing head having a structure that a plurality of reproducing head elements 126a, 126b, 126c and 126d made by sandwiching magnetoresistive effect elements (hereinafter referred to as MR elements) 125 via insulating layer 124 between pairs of magnetic shielding layers 123 on a first non-magnetic substrate 122 as a base by the thin film forming technique such as, for example, a plating method, a sputtering method, an ion milling method, and a second non-magnetic substrate 127 is adhered thereon. The number of laminating this reproducing head elements is arbitrary. Here, a multi-thin film magnetic reproducing head of four channels having four reproducing head elements 126a, 126b, 126c and 126d will be described as an example.

Figure 24:
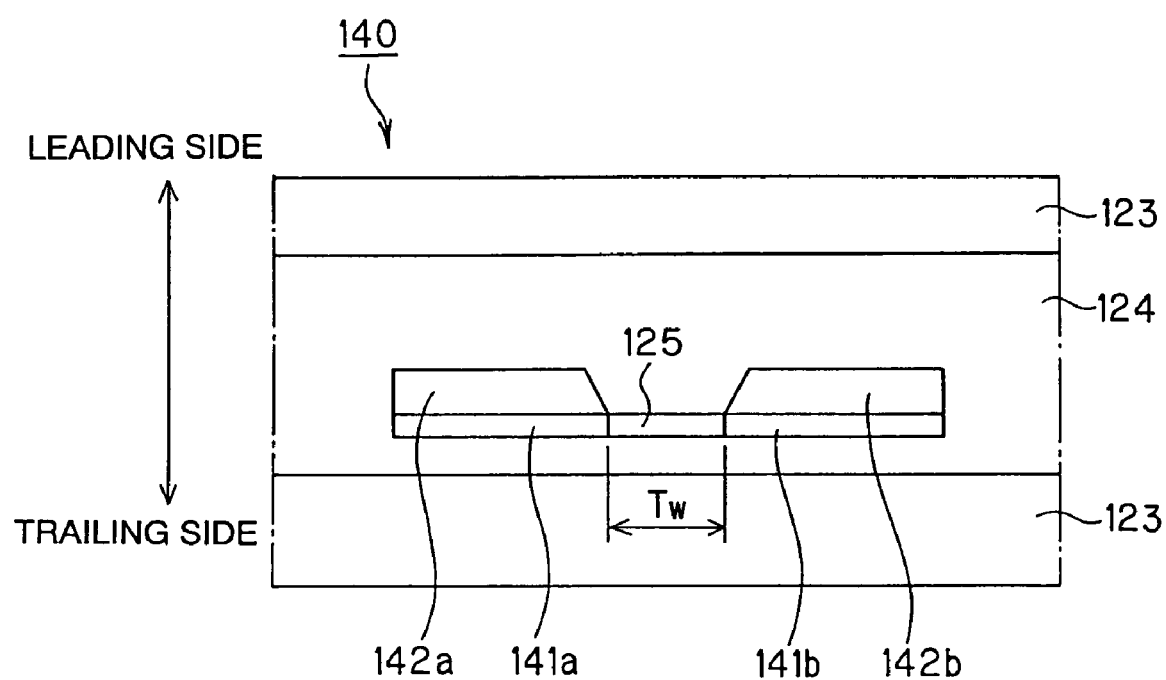
FIG. 24 is an end view showing an essential part of a reproducing head element as seen from the medium opposed surface.

A plurality of reproducing head elements 126a, 126b, 126c, 126d are magnetoresistive effect type magnetic heads (hereinafter referred to as MR heads) 140, shown in FIG. 24. Since this MR head 140 is formed of respective constituting elements by the above-mentioned thin film forming technique, a track can be narrowed, and the MR head 140 can deal with higher recording density of a magnetic recording medium.

More particularly, this MR head 140 has a structure that the MR element 125 is sandwiched via an insulating layer 124 between the above-mentioned a pair of upper and lower magnetic shielding layers 123 so that the magnetic field out of an object to be reproduced of a signal magnetic field from the magnetic tape 103 may not be led in the MR element 125, and reads the signal recorded on the magnetic tape 103 by detecting the voltage change of sense current while flowing the sense current to the MR element 125.

As the MR element 125, for example, an MR element utilizing an anisotropic magnetoresistive effect, an MR element utilizing a SAL (Soft Adjacent Layer) bias method, or an MR element utilizing a giant magnetoresistivity (GMR), such as a spin valve film, etc. for obtaining a larger output, etc., can be used.

In order to stabilize the operation of this MR element 125, a pair of permanent magnet films 141a, 141b for applying a bias magnetic field to this MR element 125, and a pair of low resistance films 142a, 142b for reducing the resistance value of the MR element 125 are provided at both ends of the MR element 125 in a longitudinal direction. Though omitted in the drawings, one ends of lead conductor extended toward the opposite side to a medium opposed surface are connected to the pair of the low resistance films 142a, 142b. An external connection terminal for connecting to an external circuit for supplying the sense current to the MR element 125 is provided at the other ends of the lead conductors.

The plurality of reproducing head elements 126a, 126b, 126c and 126d composed of the above-mentioned MR heads 140 are such that the width of the part sandwiched between the pair of permanent magnet films 141a and 141b of the MR element 125 becomes the reproducing track width of this MR element 125. The reproducing head elements 126a, 126b, 126c and 126d are formed, as shown in FIG. 23, so that the respective reproducing track widths become the width substantially coincident with the track widths $Tw_1$, $Tw_2$, $Tw_3$ and $Tw_4$ of the recording tracks $Tr_1$, $Tr_2$, $Tr_3$ and $Tr_4$ formed on the magnetic tape 103.

These plurality of the reproducing head elements 126a, 126b, 126c and 126d are disposed to be deviated in a direction perpendicular to the laminating direction, that is, in the track width direction so that the ends of the adjacent MR elements 126 coincide with each other as seen from the laminating direction or are superposed in a predetermined width.

Incidentally, the first and third reproducing head elements 126a, 126c of the four reproducing head elements 126a, 136b, 126c and 126d for constituting the pair of the reproducing heads 112a, 112b are disposed so that the reproducing gap becomes oblique in response to a predetermined azimuth angle to the direction perpendicular to the scanning direction of the head so as to reproduce a signal from the recording rack recorded by the first and third recording head elements 4a, 4c. On the other hand, the second and fourth reproducing head elements 126b, 126d are disposed so that the reproducing gap becomes reverse to the first and third reproducing head elements 126a, 126c and oblique in response to a predetermined azimuth angle to the direction perpendicular to the scanning direction of the head so as to reproduce a signal from the recording track recorded by the second and fourth recording head elements 4b, 4d. That is, the first and the third reproducing head elements 126a, 126c and the second and the fourth reproducing head elements 126b, 126d are set so that the directions of inclining the azimuth angles to each other become reverse.

In the magnetic tape device 101 constituted as described above, the pair of recording heads 111a, 111b mounted on the rotary drum 114 and the pair of the reproducing heads 112a, 112b are scanned obliquely to the magnetic tape 103 by rotatably driving the rotary drum 114 in a direction of an arrow C in FIG. 21 by the drive motor 116 while the magnetic tape 103 wound on the head drum 113 is run in a direction of the arrows B in FIG. 21. The pair of the recording heads 111a, 111b mounted on this rotary drum 114 and the pair of the reproducing heads 112a, 112b record or reproduce the signal while sliding contact with the magnetic tape 103.

Figure 25:
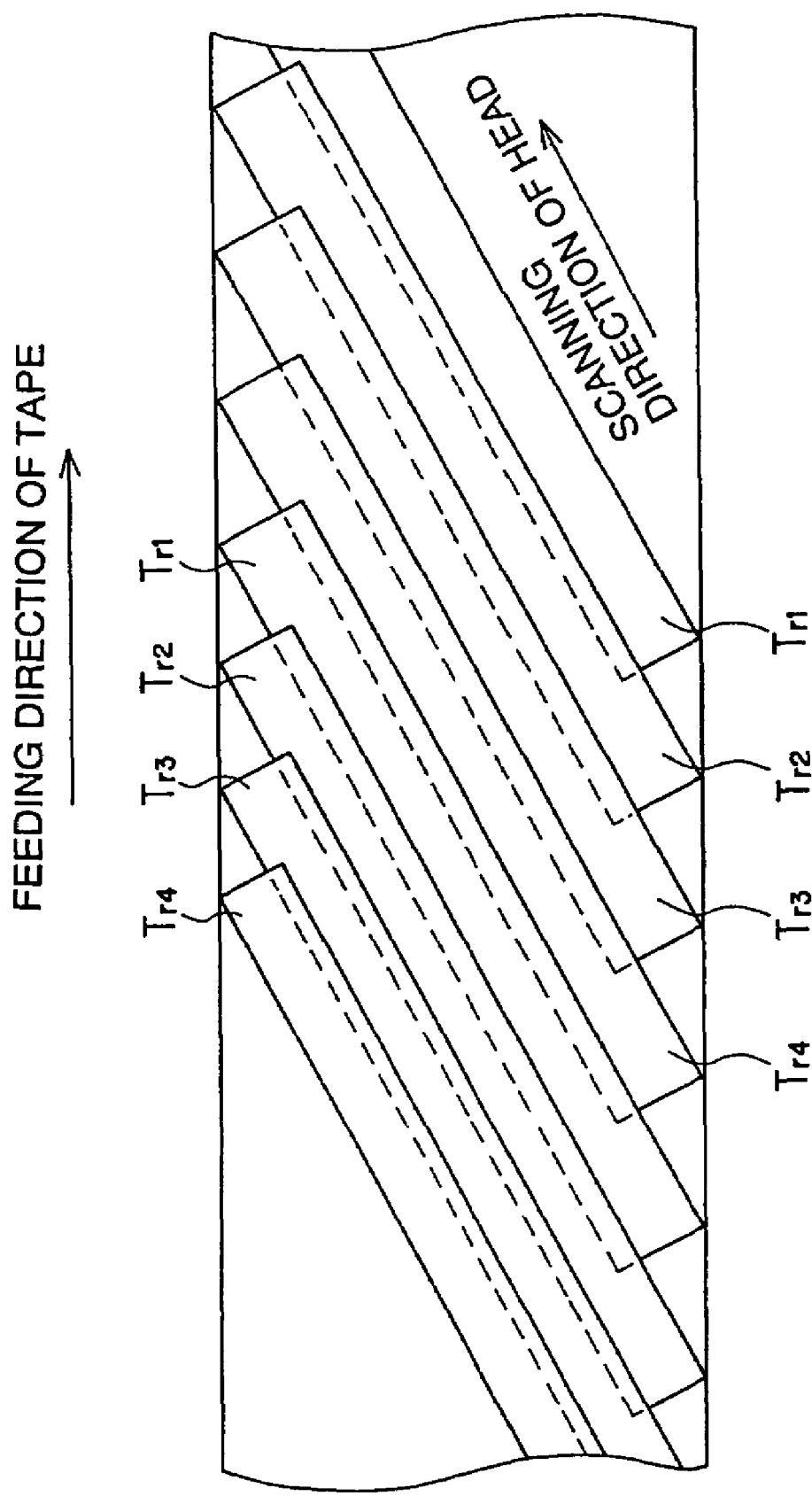
FIG. 25 is a plan view schematically showing a recording track formed on a magnetic tape.

More particularly, as shown in FIG. 25, when the preceding recording head (for example, one recording head 111a) is scanned to the magnetic tape 103 at a recording time, the plurality of the recording head elements 4a, 4b, 4c and 4d of this recording head 111a obliquely form a plurality of recording tracks $Tr_1$, $Tr_2$, $Tr_3$ and $Tr_4$ aligned in a direction perpendicular to the scanning direction of the head with respect to the running direction of the magnetic tape 103 while applying a magnetic field in response to a record signal to the magnetic tape 103.

Subsequently, the other recording head 111b is scanned to the magnetic tape 103 so as to overwrite the recording track Tr1 formed by the first recording head element 4a of next scanning recording head (for example, the other recording head 111b) only in a predetermined width $OL_4$ on the recording track $Tr_4$ formed by the fourth recording head element 4d of the preceding recording head 111a. Thus, the plurality of recording tracks $Tr_1$, $Tr_2$, $Tr_3$ and $Tr_4$ aligned in a direction perpendicular to the scanning direction of the head are formed obliquely to the running direction of the magnetic tape 103 while applying a magnetic field in response to a recording signal to the magnetic tape 103 by the recording head elements 4a, 4b, 4c and 4d of the recording head 111b.

The signal is continuously recorded on the magnetic tape 103 by forming recording tracks $Tr_1$, $Tr_2$, $Tr_3$ and $Tr_4$ repeatedly to the magnetic tape 103 by these pair of the recording heads 111a, 111b.

On the other hand, when the one reproducing head 112a corresponding to one recording head 111a is first scanned to the magnetic tape 103 at a reproducing time, the reproducing head elements 126a, 126b, 126c and 126d of this reproducing head 112a detect signal magnetic fields from the recording tracks $Tr_1$, $Tr_2$, $Tr_3$ and $Tr_4$ recorded on the magnetic tape 103 by one recording head 111a.

Then, when the other reproducing head 112b corresponding to the other recording head 111b is scanned to the magnetic tape 103, the plurality of reproducing head elements 126a, 126b, 126c and 126d of this reproducing head 112b detect the signal magnetic fields from the recording tracks $Tr_1$, $Tr_2$, $Tr_3$ and $Tr_4$ recorded on the magnetic tape 103 by the other recording head 112b.

The signal recorded on the magnetic tape 103 is continuously reproduced by detecting the signal magnetic fields repeatedly from the recording tracks $Tr_1$, $Tr_2$, $Tr_3$ and $Tr_4$ by the pair of reproducing heads 112a, 112b.

As described above, since this magnetic tape device 101 uses the rotary head device 110 mounting the above-mentioned magnetic head device 1, when the plurality of recoding tracks $Tr_1$, $Tr_2$, $Tr_3$ and $Tr_4$ aligned in the direction perpendicular to the scanning direction of the head to the magnetic tape 103 are formed by the plurality of the recording head elements 4a, 4b, 4c and 4d, a recording track $Tr_{n+1}$ written next on the previously written recording track $Tr_n$ is overwritten by a predetermined width $OL_n$. Thus, the recording tracks $Tw_1$, $Tw_2$, $Tw_3$ and $Tw_4$ narrower than the track widths $W_1$, $W_2$, $W_3$ and $W_4$ formed by the respective recording head elements 4a, 4b, 4c and 4d can be accurately formed on the magnetic tape 103.

Therefore, in this magnetic tape device 101, the recording track formed on the magnetic tape 103 can be narrowed, and high recording density and fast recording speed of the magnetic tape 103 can be performed by multi-channeling.

Incidentally, in the above-mentioned magnetic tape device 101, a pair of reproducing heads 112a, 112b, is not only limited to a structure having a multi-thin film magnetic head corresponding to one reproducing head element for one recording track, but also a structure having a multi-thin film magnetic reproducing head corresponding to a plurality of the reproducing head elements to one recording track.

As the above-mentioned pair of the reproducing heads 111a, 111b, A magnetic tunnel effect type magnetic head having a magnetic tunnel junction element in which the conductance of a tunnel current flowing from one magnetic layer to the other magnetic layer changes depending on the relative angle of magnetizations of a pair of magnetic layers by laminating a pair of magnetic layers via an insulating layer may be used.

In the above-mentioned magnetic tape device 101, not only a guard bandless recording system adopting the above-mentioned azimuth recording, but also a non-azimuth recording which does not have an azimuth angle, that is, the magnetic gap of the respective recording head elements 4a, 4b, 4c and 4d become parallel to a direction perpendicular to the scanning direction of the head can be adopted.

Further, in the above-mentioned magnetic tape device 101, a guard band recording system having an unrecording area, so-called a guard band between a plurality of tracks formed by one recording head 111a and a plurality of recording tracks formed by the other recording head 111b can be adopted.

In addition to the magnetic tape device 100 adopting the above-mentioned helical scan system, the present invention can be applied to a magnetic tape device in which so-called a linear recording system for recording a signal on a magnetic tape while scanning the above-mentioned magnetic head device 1 mounted, for example, in a fixed head device in parallel with the running direction of the magnetic tape is adopted.

Then, a magnetic disc device using the above-mentioned magnetic head device 1 as a magnetic recording means will be described.

Figure 26:
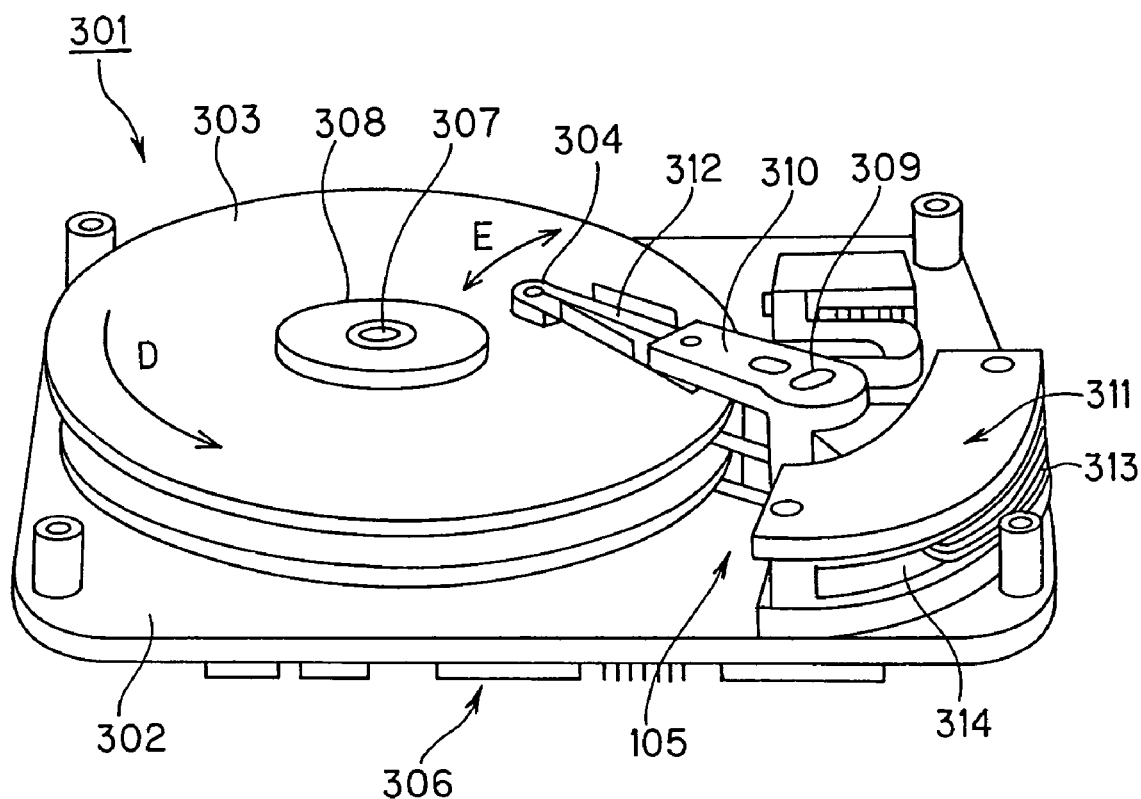
FIG. 26 is a structural view showing the configuration of the magnetic disc device to which the present invention is applied.
Figure 27:
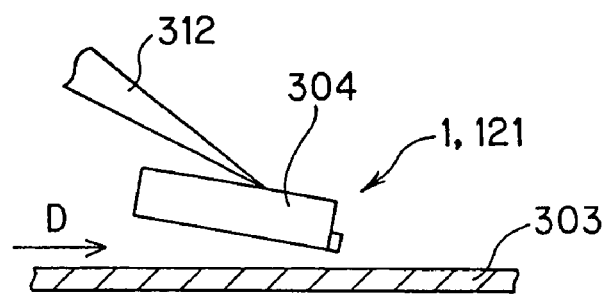
FIG. 27 is a side view showing an essential part of the above-mentioned magnetic disc device in an enlarged manner.

As shown in FIG. 26 and FIG. 27, a magnetic disc device 301 to which the present invention is applied comprises a magnetic disc 303 rotatably driven by a spindle motor (not shown), and a head actuator 305 having a head slider 304 floating on the magnetic disc 303 at a distal end, on a chassis 302 of the device main body provided in a housing (not shown).

The magnetic disc device 301 comprises a signal processing circuit for performing a signal processing, etc. at recording and reproducing time, respective control circuits 306, such as a servo control circuit for performing a servo control, etc., and a system controller, for controlling the entire system, etc. on the main surface of the chassis 302 at opposite side to the surface to be mounted with the magnetic disc 303, the head actuator 305, etc.

The magnetic disc 303 is so-called a hard disc which includes a magnetic layer, a protective layer, etc. sequentially laminated on a substantially disc-like disc substrate having a central hole at a substantially center. A plurality of magnetic discs 303 are fixed by a damper 308 while its central hole is engaged with the rotary shaft 307 of the spindle motor in this magnetic disc device 301. These magnetic discs 303 are rotatably driven at a predetermined speed in a direction of an arrow D in FIG. 26 by the spindle motor to be controlled to be driven by the control circuit.

The head actuator 305 has a supporting arm 310 rotated at its supporting axle 309 as a center, a voice coil motor 311 provided at one end side of this supporting arm 310, a suspension 312 mounted at the other end side of the supporting arm 310 and having a predetermined elasticity, and the head slider 304 mounted at the distal end of this suspension 312.

The voice coil motor 311 has a coil 313 mounted at the supporting arm 310 side, and a magnet 314 mounted at the chassis 302 side opposed to this coil 313. A current is supplied to the coil 313 to generate a magnetic field. The supporting arm 310 is rotated in a radial direction of the magnetic disc 303 shown by arrows E in FIG. 26 by a magnetic action of the magnet 314 disposed oppositely to this coil 313.

The suspension 312 has the head slider 304 mounted at its distal end to bias this head slider 304 toward the magnetic disc 303 side by an elastic force while supporting the head slider 304.

The head slider 304 is supported oppositely to the signal recording surface of the magnetic disc 303 at the distal end of each suspension 312 of a plurality of the supporting arms 310 corresponding to the respective magnetic discs 303. An air lubrication surface (ABS surface) for generating a flotation force by an air stream generated by the rotation of this magnetic disc 303 is formed on the surface (hereinafter referred to a medium opposed surface) of this head slider 304 opposed to the magnetic disc 303. That is, the head slider 304 mounted at the distal end of the suspension 312 receives the air stream generated by the rotation of the magnetic disc 303 to float in a predetermined flotation amount on this magnetic disc 303.

The above-mentioned magnetic head device 1 shown in FIG. 12 as a recording head for recording a signal to the magnetic disc 303 and the above-mentioned magnetic head device 11 shown in FIG. 23 as a reproducing head for reproducing the signal from the magnetic disc 303 are mounted at the rear end of the flotation feeding head slider 304.

In the magnetic disc device 301 constructed as described above, when the magnetic disc 303 is rotatably driven by the spindle motor, the air stream is generated on the signal recording surface of the magnetic disc 303. The flotation force is generated on the head slider 304 by introducing this air stream between the signal recording surface of the magnetic disc 303 and the head slider 304, and hence this head slider 304 is floated by a predetermined flotation amount on the signal recording surface of the magnetic disc 303. In this magnetic disc device 301, the signal is recorded on or reproduced from the magnetic disc 303 by the above-mentioned magnetic head devices 1, 121 mounted on the head slider 304 while the head slider 304 is floated on the signal recording surface of the magnetic disc 303.

More particularly, when this magnetic head device 1 is scanned to the magnetic disc 303, the first magnetic core layers 23a of the respective recording head elements 4a, 4b, 4c and 4d are disposed to be positioned at the preceding side from the second magnetic core layers 21a in the scanning direction of the head.

At the recording time, the magnetic head device 1 is scanned to the magnetic disc 303. Thus, the plurality of recording head elements 4a, 4b, 4c and 4d of this magnetic head device 1 spirally form the plurality of recording tracks $Tr_1$, $Tr_2$, $Tr_3$ and $Tr_4$ aligned in a direction perpendicular to the scanning direction of the head on the signal recording surface of the magnetic disc 303 while applying a magnetic field in response to the recording signal to the magnetic disc 303. When the magnetic head device 1 circulates in one cycle on the magnetic disc 303, the magnetic head device 1 is scanned to the magnetic disc 303 so that the recording track $Tr_1$ formed by the next first recording head element 4a is overwritten in a predetermined width $OL_4$ on the recording track $Tr_4$ formed by the fourth recording head element 4d of the magnetic head device 1 before one circulation. Thus, the signal is continuously recorded on the magnetic disc 303 by repeatedly forming recording tracks $Tr_1$, $Tr_2$, $Tr_3$ and $Tr_4$ to the magnetic disc 303 by the magnetic head device 1.

On the other hand, at the reproducing time, when the magnetic head device 121 is scanned to the magnetic disc 303, the plurality of reproducing head elements 126a, 126b, 126c and 126d of this magnetic head device 121 continuously reproduce the signal recorded on the magnetic disc 303 by detecting the signal magnetic field from the plurality of the recording tracks $Tr_1$, $Tr_2$, $Tr_3$ and $Tr_4$ recorded on the magnetic disc 303 by the magnetic head device 1.

As described above, since this magnetic disc device 301 uses the above-mentioned magnetic head device 1, when the plurality of the recording head elements 4a, 4b, 4c and 4d form the plurality of recording tracks $Tr_1$, $Tr_2$, $Tr_3$ and $Tr_4$ aligned in the direction perpendicular to the scanning direction of the head to the magnetic disc 303, the recording tracks $Tw_1$, $Tw_2$, $Tw_3$ and $Tw_4$ narrower than the track widths $W_1$, $W_2$, $W_3$ and $W_4$ of the recording tracks formed by the respective recording head elements 4a, 4b, 4c and 4d can be accurately formed on the magnetic disc 303 by overwriting the recording track $Tr_{n+1}$ written next by a predetermined width $OL_n$ on the previously written recording track $Tr_n$.

Therefore, in this magnetic disc device 301, the recording track formed on the magnetic disc 303 can be narrowed, and high recording density of the magnetic disc 303 and the acceleration of the recording speed can be performed by multi-channeling.

Incidentally, it is noted that the present invention is not limited to the configuration in which the magnetic head devices 1 and 121 are mounted on the head slider and scanned while floating on the signal recording surface of the magnetic disc, like the disc device 301, but can be applied to a device that records/reproduces a signal to/from the magnetic disc by scanning the magnetic head devices 1 and 121 while sliding contact with the magnetic disc.

Further, the present invention is not limited to the configuration separately mounting the above-mentioned magnetic head devices 1, 121 but can use so-called a merge type thin film magnetic head formed as a result of combining these magnetic head devices 1, 121.

What is claimed is:

1. A magnetic head device having a plurality of recording head elements scanned to a magnetic recording medium, the recording head elements sequentially laminated on a base through insulating layers and the laminated recording head elements disposed to be deviated in a direction perpendicular to a laminating direction of the recording head elements so that when the recording head elements are scanned to the magnetic recording medium, the plurality of the recording head elements form a plurality of recording tracks aligned in a direction perpendicular to the scanning direction of the head, wherein the plurality of recording head elements are formed so that the size in a track width direction of a first magnetic core layer positioned at a preceding side in the scanning direction of the head of a pair of magnetic core layers opposed via a magnetic gap becomes smaller than the size in a track width direction of a second magnetic core layer positioned at an opposite side to the first magnetic core layer in a medium opposed surface opposed to the magnetic recording medium and the ends of the first magnetic core layers of adjacent recording head elements are superposed by a predetermined width as seen from the laminating direction.

2. The magnetic head device according to claim 1, wherein the first magnetic core layer is such that the size of the medium opposed surface in the track width direction is larger than the size in the laminating direction.

3. The magnetic head device according to claim 1, wherein the recording head element is of inductive type thin film magnetic head that includes the second magnetic core layer, a non-magnetic layer and the first magnetic core layer sequentially laminated from the base side, the first magnetic core layer and the second magnetic core layer respectively have protruding parts opposed to the medium opposed surface, these protruding parts are opposed to each other via the non-magnetic layer to form the magnetic gap, the first magnetic core layer and the second magnetic core layer are connected at the other end side spaced in a depth direction from the medium opposed surface, and a thin film coil is wound on this connected part as a center.

4. A rotary head device comprising a rotary drum, and magnetic recording means mounted on this rotary drum and obliquely scanned to a running direction of a magnetic tape by a helical scan system, wherein the magnetic recording means has a plurality of recording head elements scanned to the magnetic tape, these plurality of recording head elements are sequentially laminated on a base via insulating layers, the laminated plurality of recording head elements are disposed to be deviated in a direction perpendicular to the laminating direction so that when the plurality of recording head elements are scanned to the magnetic tape, the plurality of recording head elements form a plurality of recording tracks aligned in a direction perpendicular to the scanning direction of the head, the plurality of recording head elements are formed such that the size in a track width direction of a first magnetic core layer positioned at the preceding side in the scanning direction of the head of a pair of magnetic core layers opposed via a magnetic gap becomes smaller than the size in a track width direction of a second magnetic core layer positioned at its opposite side in the medium opposed surface opposed to the magnetic tape, and the ends of the first magnetic core layers of the adjacent recording head elements are disposed to be superposed by a predetermined width as seen from the laminating direction.

5. The rotary head device according to claim 4, wherein the first magnetic core layer is such that the size of the track width direction in the medium opposed surface is larger than the size in the laminating direction.

6. The rotary head device according to claim 4, wherein the recording head element is of inductive type thin film magnetic head that includes the second magnetic core layer, a non-magnetic layer and the first magnetic core layer sequentially laminated from the base side, the first magnetic core layer and the second magnetic core layer respectively have protruding parts opposed to the medium opposed surface, these protruding parts are opposed to each other via the non-magnetic layer to form the magnetic gap, the first magnetic core layer and the second magnetic core layer are connected at the other end side spaced in a depth direction from the medium opposed surface, and a thin film coil is wound on this connected part as a center.

7. A magnetic tape device comprising:

tape running means for running a magnetic tape, and magnetic recording means for recording a signal to a magnetic tape run by the tape running means, wherein the magnetic recoding means has a plurality of recording head elements scanned to the magnetic tape, these plurality of recording head elements are sequentially laminated on a base via insulating layers, the laminated plurality of recording head elements are disposed to be deviated in a direction perpendicular to the laminating direction so that when the plurality of recording head elements are scanned to the magnetic tape, the plurality of recording head elements form a plurality of recording tracks aligned in a direction perpendicular to the scanning direction of the head, the plurality of recording head elements are formed such that the size in a track width direction of the first magnetic core layer positioned at the preceding side in the scanning direction of the head of a pair of magnetic core layers opposed via a magnetic gap becomes smaller than the size in a track width direction of a second magnetic core layer positioned at its opposite side in the medium opposed surface opposed to the magnetic tape, and the ends of the first magnetic core layers of the adjacent recording head elements are disposed to be superposed by a predetermined width as seen from the laminating direction.

8. The magnetic tape device according to claim 7, wherein the first magnetic core layer is such that the size in the track width direction on the medium opposed surface is larger than the size in the laminating direction.

9. The magnetic tape device according to claim 7, wherein the recording head element is of inductive type thin film magnetic head that includes the second magnetic core layer, a non-magnetic layer and the first magnetic core layer sequentially laminated from the base side, the first magnetic core layer and the second magnetic core layer respectively have protruding parts opposed to the medium opposed surface, these protruding parts are opposed to each other via the non-magnetic layer to form the magnetic gap, the first magnetic core layer and the second magnetic core layer are connected at the other end side spaced in a depth direction from the medium opposed surface, and a thin film coil is wound on this connected part as a center.

10. The magnetic tape device according to claim 7, wherein the magnetic recording means is mounted on the rotary drum and the plurality of recording head elements are scanned obliquely to the running direction of the magnetic tape by a helical scan system.

11. The magnetic tape device according to claim 7, wherein in the magnetic recording means, the plurality of recording head elements are scanned in parallel with the running direction of the magnetic tape by a linear system.

12. A magnetic disc device comprising:

disc rotating means for rotatably driving a magnetic disc; and magnetic recording means for recording a signal to a magnetic disc rotatably driven by the disc rotating mans, wherein the magnetic recoding means has a plurality of recording head elements scanned to the magnetic disc, these plurality of recording head elements are sequentially laminated on a base via insulating layers, the laminated plurality of recording head elements are disposed to be deviated in a direction perpendicular to the laminating direction so that when the plurality of recording head elements are scanned to the magnetic disc, the plurality of recording head elements form a plurality of recording tracks aligned in a direction perpendicular to the scanning direction of the head, the plurality of recording head elements are formed such that the size in a track width direction of the first magnetic core layer positioned at the preceding side in the scanning direction of the head of a pair of magnetic core layers opposed via a magnetic gap becomes smaller than the size in a track width direction of a second magnetic core layer positioned at its opposite side in the medium opposed surface opposed to the magnetic disc, and the ends of the first magnetic core layers of the adjacent recording head elements are disposed to be superposed by a predetermined width as seen from the laminating direction.

13. The magnetic disc device according to claim 12, wherein the first magnetic core layer is such that the size in the track width direction on the medium opposed surface is larger than the size in the laminating direction.

14. The magnetic disc device according to claim 12, wherein the recording head element is of inductive type thin film magnetic head that includes the second magnetic core layer, a non-magnetic layer and the first magnetic core layer sequentially laminated from the base side, the first magnetic core layer and the second magnetic core layer respectively have protruding parts opposed to the medium opposed surface, these protruding parts are opposed to each other via the non-magnetic layer to form the magnetic gap, the first magnetic core layer and the second magnetic core layer are connected at the other end side spaced in a depth direction from the medium opposed surface, and a thin film coil is wound on this connected part as a center.

15. The magnetic disc device according to claim 12, wherein the magnetic recording means is mounted on a slider and is driven to be displaced in a radial direction of the magnetic disc.

16. A magnetic recording method comprising: sequentially laminating a plurality of recording head elements scanned to a magnetic recording medium on a base via insulating layers, and disposing the laminated recoding head elements to be deviated in a direction perpendicular to the laminating direction such that when scanned to the magnetic recording medium, the plurality of recording head elements from a plurality of recording tracks aligned in a direction perpendicular to the scanning direction of the head, wherein the plurality of recording head elements are formed so that the size in a track width direction of a first magnetic core layer of a pair of magnetic core layers opposed via a magnetic gap becomes smaller than the size in a track width direction of a second magnetic core in a medium opposed surface opposed to the magnetic recording medium, and the ends of the first magnetic core layers of adjacent recording heads are disposed to be superposed by a predetermined width as seen from the laminating direction, and the first magnetic core layers are positioned at the preceding side in the scanning direction of the head when the plurality of recording head elements are scanned to the magnetic recording medium.

17. The magnetic recording method according to claim 16, wherein the size in the width direction of the first magnetic core layer on the medium opposed surface is larger than the size in the laminating direction.

18. The magnetic recording method according to claim 16, wherein, as the recording head element, an inductive type thin film magnetic head is used, in which the second magnetic core layer, a non-magnetic layer and the first magnetic core layer are sequentially laminated from the base side, the first magnetic core layer and the second magnetic core layer respectively have protruding parts opposed to the medium opposed surface, these protruding parts are opposed to each other via the non-magnetic layer to form the magnetic gap, the first magnetic core layer and the second magnetic core layer are connected at the other end side spaced in a depth direction from the medium opposed surface, and a thin film coil is wound on this connected part as a center.

* * * * *